(12) United States Patent
Kang

(10) Patent No.: US 11,585,755 B2
(45) Date of Patent: Feb. 21, 2023

(54) SYSTEM FOR MEASURING ANOMALOUS DIFFUSION USING FLUORESCENCE RECOVERY AFTER PHOTOBLEACHING AND ASSOCIATED METHOD

(71) Applicant: THE TEXAS A&M UNIVERSITY SYSTEM, College Station, TX (US)

(72) Inventor: Minchul Kang, Rockwall, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 209 days.

(21) Appl. No.: 17/083,365

(22) Filed: Oct. 29, 2020

(65) Prior Publication Data

US 2021/0223174 A1     Jul. 22, 2021

Related U.S. Application Data

(60) Provisional application No. 62/962,070, filed on Jan. 16, 2020.

(51) Int. Cl.
   *G01N 21/64* (2006.01)
   *G02B 21/00* (2006.01)

(52) U.S. Cl.
   CPC ..... *G01N 21/6402* (2013.01); *G01N 21/6408* (2013.01); *G01N 21/6428* (2013.01);
   (Continued)

(58) Field of Classification Search
   CPC ........... G01N 21/6402; G01N 21/6408; G01N 21/6428; G01N 21/6458;
   (Continued)

(56) References Cited

U.S. PATENT DOCUMENTS

| | | | | |
|---|---|---|---|---|
| 5,784,162 A | * | 7/1998 | Cabib | C12Q 1/6883 435/6.12 |
| 7,557,915 B2 | * | 7/2009 | Maier | G01J 3/44 356/307 |

(Continued)

FOREIGN PATENT DOCUMENTS

EP     2776813 B1     1/2018

OTHER PUBLICATIONS

Periasamy et al. Analysis of Fluorophore Diffusion by Continuous Distributions of Diffusion Coefficients: Application to Photobleaching Measurements of Multicomponent and Anomalous Diffusion, Biophysical Journal vol. 75 Jul. 1998 557-567 (Year: 1998).*

(Continued)

*Primary Examiner* — David P Porta
*Assistant Examiner* — Djura Malevic
(74) *Attorney, Agent, or Firm* — Allen, Dyer, Doppelt + Gilchrist, P.A.

(57) ABSTRACT

A system and associated method measures anomalous diffusion of biomolecules in cell membranes of intact cells and includes a laser that illuminates a cell membrane within an intact cell to express fluorescently tagged biomolecules. The laser photobleaches a region of interest and illuminates the region of interest over time. A detector detects the fluorescence recovery over time within the region of interest to yield fluorescence recovery after photobleaching (FRAP) data. A controller computes the mean square displacement (MSD) of diffusing biomolecules and a time-dependent diffusion coefficient D(t) from a plurality of time points of the FRAP data and determines the anomalous diffusion in the cell membrane.

14 Claims, 12 Drawing Sheets

(52) U.S. Cl.
CPC ..... *G01N 21/6458* (2013.01); *G02B 21/0032* (2013.01); *G02B 21/0076* (2013.01); *G01N 2021/6439* (2013.01); *G01N 2201/06113* (2013.01)

(58) Field of Classification Search
CPC . G01N 2021/6439; G01N 2201/06113; G02B 21/0032; G02B 21/0076; G02B 21/367
See application file for complete search history.

(56) References Cited

U.S. PATENT DOCUMENTS

| | | | |
|---|---|---|---|
| 7,659,978 B2 | 2/2010 | Tuschel et al. | |
| 7,907,769 B2* | 3/2011 | Sammak | G06K 9/6269 435/7.25 |
| 8,189,900 B2* | 5/2012 | Sammak | G06V 20/69 435/7.25 |
| 8,809,809 B1* | 8/2014 | Wu | G02B 21/16 359/383 |
| 9,117,273 B2* | 8/2015 | Sibarita | G06T 7/168 |
| 9,557,292 B2* | 1/2017 | Mayer | G01N 27/44791 |
| 9,885,705 B2* | 2/2018 | Garini | G01N 33/5029 |
| 10,100,102 B2* | 10/2018 | Lai | A61P 37/00 |
| 10,317,361 B2* | 6/2019 | Mayer | G01N 33/48721 |
| 10,656,117 B2* | 5/2020 | Mayer | G01N 33/48721 |
| 2002/0030811 A1* | 3/2002 | Schindler | G01N 21/6452 356/318 |
| 2004/0051051 A1 | 3/2004 | Kato et al. | |
| 2004/0071328 A1* | 4/2004 | Vaisberg | G01N 15/1475 382/129 |
| 2008/0274905 A1* | 11/2008 | Greene | G01N 21/6428 506/17 |
| 2009/0017449 A1* | 1/2009 | Van Oijen | G01N 33/56983 435/5 |
| 2009/0290780 A1* | 11/2009 | Kottig | G01N 21/6408 382/133 |
| 2011/0057121 A1* | 3/2011 | Yang | G01J 3/4406 250/491.1 |
| 2013/0035567 A1* | 2/2013 | Strano | G01N 33/54373 977/750 |
| 2013/0294645 A1* | 11/2013 | Sibarita | G01N 21/64 382/103 |
| 2014/0246317 A1* | 9/2014 | Mayer | G01N 33/48721 204/452 |
| 2015/0284451 A1* | 10/2015 | Lai | C07K 16/1235 435/7.92 |
| 2016/0238610 A1* | 8/2016 | Garini | G01N 21/6458 |
| 2016/0274107 A1* | 9/2016 | Cognet | G01N 21/6428 |
| 2017/0138898 A1* | 5/2017 | Mayer | G01N 33/48721 |
| 2018/0106781 A1* | 4/2018 | Garini | G01N 21/6458 |
| 2018/0164205 A1* | 6/2018 | Edel | G01N 15/1056 |
| 2019/0023769 A1* | 1/2019 | Lai | C07K 16/087 |
| 2019/0183395 A1 | 6/2019 | Kay et al. | |
| 2019/0323990 A1* | 10/2019 | Mayer | G01N 27/44791 |
| 2021/0080472 A1* | 3/2021 | Linghu | C07K 14/705 |

OTHER PUBLICATIONS

Bronstein et al., Transient Anomalous Diffusion of Telomeres in the Nucleus of Mammalian Cells; PRL 103, 018102 (2009) (Year: 2009).*
Kepten et al., Improved estimation of anomalous diffusion exponents in single-particle tracking experiments; May 2013 Physical Review E 87(5-1):052713 (Year: 2013).*
Kang et al., Validation of Normalizations, Scaling, and Photofading Corrections for FRAP Data Analysis; PLOS ONE | DOI:10.1371/journal.pone.0127966 May 27, 2015 (Year: 2015).*
Adler et al., "Conventional Analysis of Movement on Non-Flat Surfaces Like the Plasma Membrane Makes Brownian Motion Appear Anomalous," Communications Biology; 2:12; 2019; pp. 1-10.
Banks et al., "Anomalous Diffusion of Proteins Due to Molecular Crowding," Biophysical Journal; vol. 89; Nov. 2005; pp. 2960-2971.
Berry et al., "Anomalous Diffusion Due to Hindering by Mobile Obstacles Undergoing Brownian Motion or Orstein-Ulhenbeck Processes," Physical Review E: Statistical, Nonlinear, and Soft Matter Physics; American Physical Society; 89(2); Jan. 23, 2014; pp. 1-10.
Day et al., "Analysis of Protein and Lipid Dynamics Using Confocal Fluorescence Recovery After Photobleaching (FRAP)," Current Protocols in Cytometry; Chapter: Unit 2.19; Oct. 2012; pp. 1-32.
Day et al., "Mechanisms Underlying the Confined Diffusion of Cholera Toxin B-Subunit in Intact Cell Membranes," PLoS ONE; vol. 7; Issue 4; e34923; Apr. 2012; pp. 1-12.
Feder et al., "Constrained Diffusion or Immobile Fraction on Cell Surfaces: A New Interpretation," Biophysical Journal; vol. 70; Jun. 1996; pp. 2767-2773.
Kang et al., "A Generalization of Theory for Two-Dimensional Fluorescence Recovery After Photobleaching Applicable to Confocal Laser Scanning Microscopes," Biophysical Journal; vol. 97; Sep. 2009; pp. 1501-1511.
Kang et al., "Proposed Correction to Feder's Anomalous Diffusion FRAP Equations," Comments to the Editor; Biophysical Journal; vol. 100; Feb. 2011; pp. 791-792.
Kang et al., "Simplified Equation to Extract Diffusion Coefficients from Confocal FRAP Data," Traffic; 2012; 13; pp. 1589-1600.
Kang et al., "Validation of Normalizations, Scaling, and Photofading Corrections for FRAP Data Analysis," PLoS ONE; 10(5); e0127966; May 27, 2015; pp. 1-28.
Lubelski et al., "Fluorescence Recovery After Photobleaching: The Case of Anomalous Diffusion," Biophysical Journal; vol. 94; Jun. 2008; pp. 4646-4653.
Nicolau et al., "Sources of Anomalous Diffusion on Cell Membranes: A Monte Carlo Study," Biophysical Journal; vol. 92; Mar. 2007; pp. 1975-1987.
Saxton, "Anomalous Subdiffusion in Fluorescence Photobleaching Recovery: A Monte Carlo Study," Biophysical Journal; vol. 81; Oct. 2001; pp. 2226-2240.
Skamrahl et al., "Simultaneous Quantification of the Interplay Between Molecular Turnover and Cell Mechanics by AFM-FRAP," www.small-journal.com; Small; 2019; 15; 1902202; pp. 1-9.
Symonds et al., "A Brief Guide to Model Selection, Multimodel Inference and Model Averaging in Behavioural Ecology Using Akaike's Information Criterion," Behavioral Ecology and Sociobiology; (2011); 65:13-21.

* cited by examiner

SYSTEM FOR MEASURING ANOMALOUS DIFFUSION USING FLUORESCENCE RECOVERY AFTER PHOTOBLEACHING AND ASSOCIATED METHOD

PRIORITY APPLICATION(S)

This application is based upon provisional application Ser. No. 62/962,070, filed Jan. 16, 2020, the disclosure which is hereby incorporated by reference in its entirety.

FIELD OF THE INVENTION

The present invention relates to the field of cellular diffusion and fluorescence microscopy, and more particularly, this invention relates to measuring anomalous diffusion using Fluorescence Recovery After Photobleaching (FRAP) and associated methods.

BACKGROUND OF THE INVENTION

Living organisms depend on the cell signaling system in live, intact cells to transport signal molecules to the correct location and trigger, switch, and modulate a new biological event. Under physiological conditions, cell signaling events are tightly controlled to guarantee that the signaling events occur in the correct location at the right time. When a cell loses control over cell signaling, very often pathological diseases may occur. Therefore, to find the time scales, or kinetic rates such as diffusion coefficients, it is necessary to understand both the physiology and pathology of cells. A majority of cells use diffusion as a major mechanism to transport signaling molecules to desirable locations in extra-/intro-cellular spaces, and especially on cell membranes where various signals are initiated and internalized.

Different techniques have been established to measure cellular diffusion. Fluorescence microscopy is a well-known technique using biomolecules as particles tagged with a fluorescence marker. For example, fluorescence microscopy using fluorescently tagged proteins is proven to work well for non-invasively studying living cells. This fluorescence imaging technique helps determine the localization of cellular structures. A number of other microscopy methods have been developed to investigate the mobility of cellular structures and their interactions, and used to retrieve valuable mechanistic information on the dynamic nature of cellular components.

Fluorescence Recovery After Photobleaching (FRAP) is a well-known technique for analyzing cellular diffusion. In FRAP, a portion of the sample is bleached in a first scan process of a scanning laser microscope. In a subsequent "post-bleach" scanning process, for example, fluorescence images of the sample are recorded. In each scan process, individual locations of a probe are scanned, which correspond to a pixel-wise scan to record a pixelized image of the fluorescence intensity. Each individual scan process usually corresponds to one image frame in which each pixel of a region of interest is scanned at least once. By repeating the scan process, consecutive image frames can be recorded. In FRAP, the recovery of the fluorescence after a photobleaching event between consecutive image frames, i.e., as the function of time, is analyzed, thereby assessing the mobility of the particles.

How fast signaling molecules are transported in cells is measured via diffusion coefficients, D ($\mu m^2$/sec). Under theoretically ideal conditions, diffusion is a memoryless process and constant in time. However, due to the heterogeneity and complexity of cell membranes, diffusion in cell membranes depends on the history of a trajectory of a diffusing molecule, and therefore, is often described by a time-dependent diffusion coefficient, D(t), which is not only able to give the history of a trajectory of a diffusing molecule, but also give the landscape of membrane environments where the diffusion occurred. It is desirable if time-dependent diffusion characteristics in analyzing cellular dynamics can be further quantified such as with anomalous diffusion using techniques such as fluorescence recovery after photobleaching (FRAP).

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

A system of measuring anomalous diffusion of biomolecules in cell membranes of intact cells includes a laser that illuminates a cell membrane within an intact cell to express fluorescently tagged biomolecules. The laser may be configured to photobleach a region of interest of the cell membrane and illuminate the region of interest over time. A detector may be configured to detect the fluorescence recovery over time within the region of interest to yield fluorescence recovery after photobleaching (FRAP) data. A controller may be connected to the laser and detector and may be configured to receive the FRAP data from the detector and compute the mean square displacement (MSD) of diffusing biomolecules and a time-dependent diffusion coefficient D(t) from a plurality of time points of the FRAP data and determine the anomalous diffusion in the cell membrane.

The fluorescently tagged biomolecules may comprise one or more of proteins and lipids. In an example, the fluorescently tagged biomolecules may comprise one or more of Alexa488-CTxB, YFP-GL-GPI, YFP-GT46 and Dil16 protein and lipid anchored probes. The controller may be configured to determine the anomalous diffusion without a single power law assumption. The laser may comprise a confocal laser scanning microscope. The controller may be configured to operate the detector to alter a detector frame rate associated with detecting the fluorescence recovery between different biomolecules. The controller may be configured to apply an Akaike Information Criterion (AIC) to the FRAP data and D(t) that yields negative values below −6000.

A method of measuring anomalous diffusion of biomolecules in cell membranes of intact cells is disclosed and comprises expressing fluorescently tagged biomolecules within a cell membrane of an intact cell. The method includes photobleaching a region of interest having the expressed fluorescently tagged biomolecules with a laser, detecting the fluorescence recovery over time within the region of interest to yield fluorescence recovery after photobleaching (FRAP) data, and computing the mean square displacement (MSD) of diffusing biomolecules and a time-dependent diffusion coefficient D(t) from a plurality of time points of the FRAP data and determining the anomalous diffusion in the cell membrane.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Figure 1A:
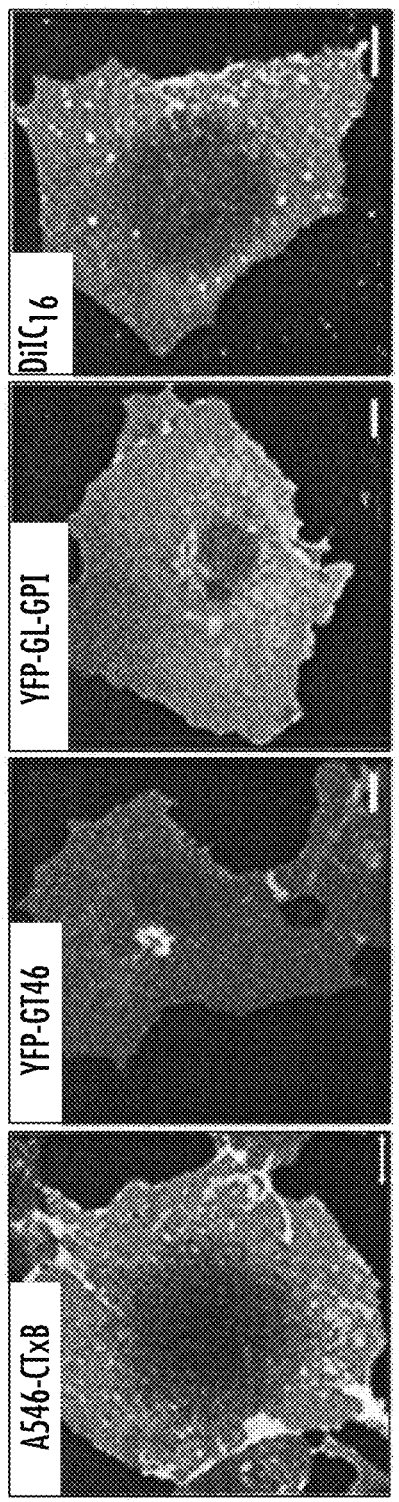
FIGS. 1A-1D show images and graphs of FRAP data acquired in live cells.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The new FRAP system, in accordance with a non-limiting example, solves for D(t) when data obtained from fluorescence recovery after photobleaching (FRAP) reveals different anomalous diffusion types in live cell membranes. Anomalous diffusion occurs in membrane proteins, but quantifying anomalous diffusion is challenging even with technological advances that have occurred in recent years. The new FRAP system, in accordance with a non-limiting example, calculates time-dependent diffusion coefficients (D(t)) from individual FRAP data points and measures D(t) of several membrane proteins, which indicates that distinct types of anomalous diffusion exist in cell membranes.

The diffusion of proteins and lipids in lipid membranes is pivotal in most aspects of cellular biology, including motility, exo-/endocytosis, and signal transduction. For this reason, a detailed understanding of membrane structure and function has long been a major area of cell biology research. To better elucidate this structure-function relationship, various tools have been developed for diffusion measurement, including Fluorescence Recovery After Photobleaching (FRAP) and Fluorescence Correlation Spectroscopy (FCS).

Due to the complexity of cellular microenvironments, biological diffusion is often correlated over time and described by a time-dependent diffusion coefficient, D(t), although the underlying mechanisms are not fully understood. Since D(t) provides important information regarding cellular structures, such as the existence of subresolution barriers to diffusion, many efforts have been made to quantify D(t) by FRAP assuming a single power law, $D(t)=\Gamma t^{\alpha-1}$ where $\Gamma$ and $\beta$ are transport coefficient and anomalous exponents. However, straightforward approaches to quantify a general form of D(t) are lacking.

In accordance with a non-limiting example, the new FRAP system includes a mathematical and computational framework to compute the mean square displacement (MSD) of diffusing molecules and diffusion coefficient D(t) from each individual time point of confocal FRAP data without using the single power law assumption. The new FRAP system uses an auxiliary equation for D(t), which can readily distinguish normal diffusion or single power law anomalous diffusion from other types of anomalous diffusion directly from FRAP data. By applying this approach to FRAP data from different membrane markers, it is apparent that a single power law anomalous diffusion assumption is not sufficient to describe various types of D(t) of membrane proteins. The approach used with this new FRAP system can be applied to other fluorescence microscopy tools such as Fluorescence Correlation Spectroscopy (FCS) and Single Particle Tracking (SPT).

INTRODUCTION

The cell membrane not only delimits and protects the cell, but also regulates cell signaling in a highly specific and selective manner via different processes. The subresolution structure of the plasma membrane is vital to signal transduction because it brings together signaling proteins in order to efficiently propagate an extracellular signal into the cytoplasm or assemble structures, such as caveolae, that are active in endocytosis and signaling molecules from outside of the cell. Because much of the inherent organization in the plasma membrane is subresolution, those skilled in the art rely on diffusion measurements of membrane components to gain insight into more complete details of the membrane structure. Therefore, accurate quantification of diffusion in cell membranes is important in understanding the biochemistry and biophysics of various cellular processes.

Diffusion may be quantified by a diffusion coefficient, D, which characterizes a linear relation between mean squared displacement (MSD, $\langle x^2 \rangle$) of a Brownian particle and time. For normal diffusion in a two dimensional plane ($\mathbb{R}^2$), the theoretical relation between MSD and time (t) satisfies:

$$\langle x^2 \rangle = 4Dt,$$

in which MSD increases linearly in time with the rate of the diffusion coefficient.

Due to heterogeneous membrane microdomains and the influence of the adjacent cytoskeleton and other factors, diffusion in membranes often shows a deviation from normal diffusion. This deviation is referred to as anomalous diffusion and is characterized by a nonlinear relationship in time between MSD and D, e.g., $\langle x^2 \rangle \propto Dt^\alpha$ with $\alpha \neq 1$. Anomalous diffusion can be divided into two classes: (1) anomalous superdiffusion, and (2) anomalous subdiffusion. Anomalous superdiffusion is when the change in the MSD increases rapidly, e.g., an order of a high power function, $\alpha>1$, as t increases. In contrast, anomalous subdiffusion refers to a slowly increasing MSD, e.g., an order of a radical function, $0<\alpha<1$, as t increases. Therefore, superdiffusion and subdiffusion are represented as: $\langle x^2 \rangle \propto Dt^\alpha$ as $\alpha>1$ and $0<\alpha<1$, respectively.

A growing number of studies have suggested that anomalous subdiffusion may frequently occur in cell membranes and is possibly due to membrane structures, including the cytoskeleton and membrane microdomains, such as lipid rafts and caveolae. Other factors that may induce anomalous diffusion include, but are not limited to, physical barriers in membranes, the interaction of proteins such as transient binding events, energy-dependent activities such as exo-/endo-cytosis, and immobilization by stereospecific, hydrophobic, or electrostatic interactions. Proteins may undergo a transition between several distinct modes of diffusion, including normal diffusion, confined diffusion, and anomalous diffusion. Nevertheless, the detailed underlying mechanisms for anomalous diffusion are still poorly understood, especially in native membranes.

Some skilled in the art argue that anomalous diffusion may be described as a time-dependent diffusion coefficient, D(t) due to a non-ergodic property of anomalous diffusion kinetics. Different analytical techniques may be used to measure D(t), including Fluorescence Recovery After Photobleaching (FRAP), Fluorescence Correlation Spectroscopy (FCS), Single Particle Tracking (SPT), and Nuclear Magnetic Resonance (NMR). However, current models and measurements of anomalous diffusion using these methods have some critical limitations. First, a single power law, $D(t) \sim t^{1-\alpha}$ with $0<\alpha<1$, has generally been assumed in conventional FRAP, FCS, and SPT approaches, although some recent methods such as super-resolution STED and scanning FOS may be used to detect various modes of subdiffusion. A single power law, however, has not been sufficient to explain a broad spectrum of anomalous diffusion in cell membranes, because membrane proteins can switch between several distinct modes of anomalous diffusion, or combinations of normal diffusion, anomalous diffusion, confined diffusion, immobilization, and possibly other modes of movement.

Second, although NMR has the ability to measure D(t) independent of a single power law assumption, NMR equipment is costly and usually lacks the capacity to abstract D(t) from a live cell. Third, while FRAP, FCS, and SPT are capable of measuring anomalous diffusion from a live cell, less attention has been made to FRAP compared to FCS and SPT due to the shortage of straightforward tools to analyze FRAP data for anomalous diffusion, even though FRAP is more cost- and time-effective than FCS and STP. Because FRAP, FCS, and SPT are complementary in a manner that these analytical techniques provide biological diffusion information in different time and spatial scales in live cells, it is desirable in some cases that parallel comparisons of measurements from FRAP, FCS, and SPT be made to grasp a holistic picture in biological diffusion.

Currently, FRAP can be performed on most modern confocal laser scanning microscopes (CLSMs), which is often referred to as confocal FRAP. Although confocal FRAP may measure anomalous diffusion in a live cell, current FRAP systems assume a single power law for anomalous diffusion, where $D(t) \sim t^{1-\alpha}$ and FRAP data are normally analyzed by data fitting to find the anomalous exponent "α." To overcome this limitation, the new FRAP system in accordance with a non-limiting example may determine D(t) based on a simplified diffusion FRAP equation and reference is made to the study described in the article by Kang et al., "Simplified Equation to Extract Diffusion Coefficients from Confocal FRAP Data," *Traffic,* 2012; 13; pp. 1589-1600, the disclosure which is hereby incorporated by reference in its entirety. The new FRAP system may determine the D(t)/MSD versus time plot from confocal FRAP data. The FRAP confocal analysis may be applied to determine anomalous diffusion numerically and to analyze FRAP data of several membrane proteins and lipid probes.

Fluorescence Recovery after Photobleaching

Fluorescence Recovery After Photobleaching (FRAP) was developed in the 1970s to study diffusion kinetics of proteins on the cell membrane. It has evolved into an important biophysical tool for tracking cellular organelles, proteins, and molecules, not only in the cell membranes, but also in the cyto-/nucleo-plasms. From an experimental perspective, FRAP includes two stages: a photobleaching stage and a fluorescence recovery stage (FIGS. 1A-1D) and the flowchart of FIG. 2. In the photobleaching stage, a region of interest (ROI) is selected from a cell expressing fluorescently tagged proteins, and then the ROI is photobleached by high intensity photobleaching mode of a laser beam. Photobleaching laser intensity and bleach time are kept to the minimum required not only to minimize diffusion during the bleach or photodamage to the cell, but to guarantee sufficient bleach depth.

In the fluorescence recovery stage, the fluorescence change within the ROI over time is observed using the illuminating mode of a laser beam. As various underlying mechanisms cause the exchange of photobleached molecules in the ROI with fluorescent molecules from outside of the ROI, the fluorescence increases in the ROI. This fluorescence recovery yields a FRAP curve or FRAP data. Since different transport and reaction mechanisms may affect the curvature and mobile fraction of a FRAP curve, kinetic parameters for underlying mechanisms can be obtained by comparing the FRAP curve to a corresponding theoretical FRAP model. For example, D can be measured by comparing a diffusion FRAP model with the experimental FRAP data to find the best fitting D.

Figure 1B:
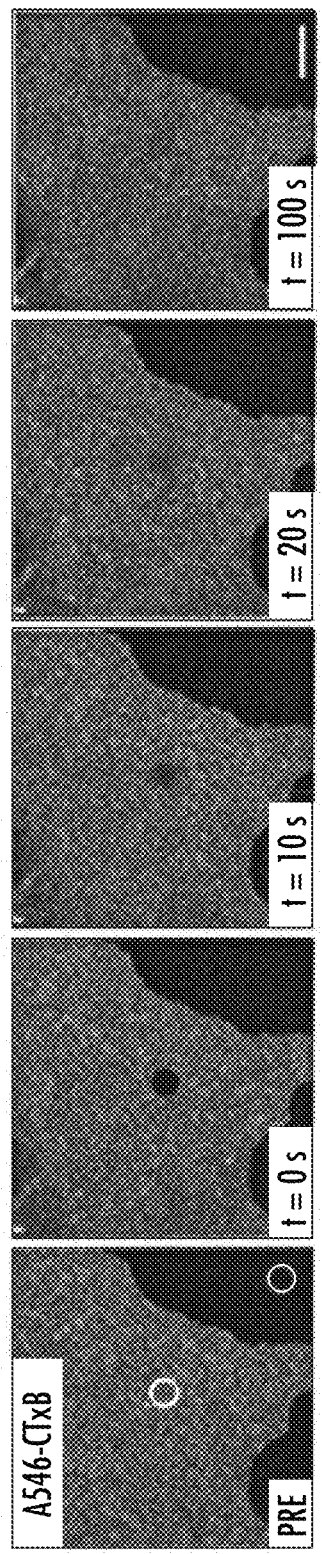

FIGS. 1A-1D illustrate an example of a FRAP experiment with FRAP data acquired in live cells. Representative whole-cell images of Alexa546-CTx-B, YFP-GT46, YFP-GL-GPI, and DiIC$_{16}$ ion COS-7 cells with single confocal slices are shown (FIG. 1A). The bar length is 10 μm. As shown in FIG. 1B, representative images of Alexa546-CTxB are shown during a FRAP experiment with the bar length at 10 μm and time at 0, 10, 20, and 100 seconds.

The graph of the Alexa546-CTxB fluorescence intensity in the bleaching ROI is shown in FIG. 10, together with an ROI outside of the bleach and outside of the cell over the course of a FRAP experiment. The average, normalized FRAP curves for Alexa546-CTxB, YFP-GT46, YFP-GL-GPI, and DiIC16 (n=8-13 cells per curve) are shown in FIG. 1D. Further details may be found in the article by Day et al., "Mechanisms Underlying the Confined Diffusion of Cholera Toxin B-Subunit in Intact Cell Membranes," *PloS One,* April 2012; 7(4); e34923, the disclosure which is hereby incorporated by reference in its entirety.

Figure 2:
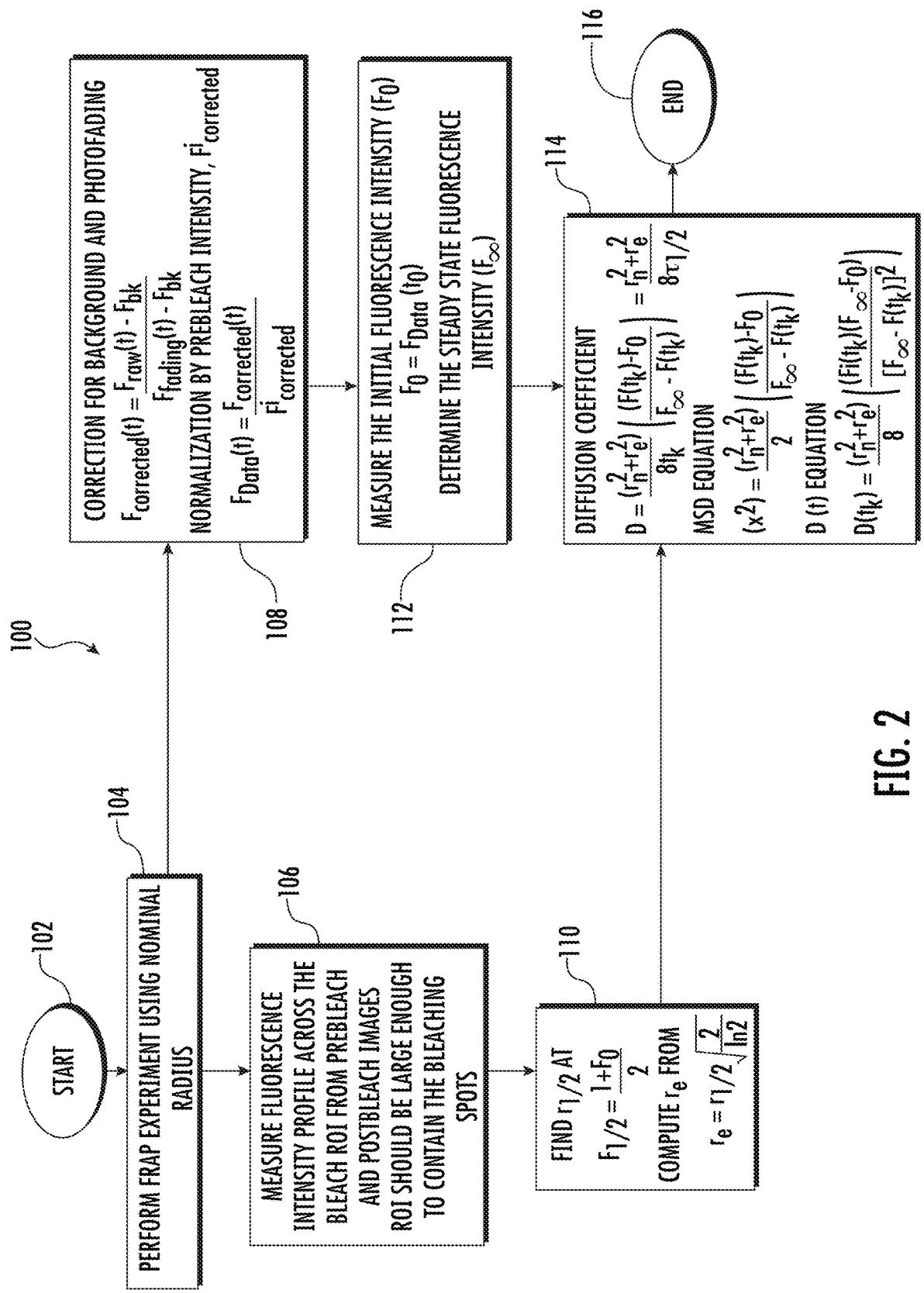
FIG. 2 is a block diagram showing the process used for the system that computes the MSD and time-dependent diffusion coefficient D(t) from FRAP data in accordance with a non-limiting example.

FIG. 2 illustrates an example workflow of applying MSD, auxiliary and D(t) equations.

As illustrated at the block diagram indicated generally at 100, the process starts (Block 102) and the FRAP experiment is performed using a nominal radius (Block 104). The fluorescence intensity profile is measured across the bleach ROI from pre-bleach and post-bleach images (Block 106) and a correction for background and photo fading is accomplished (Block 108). The $r_{1/2}$ is computed (Block 110) while also the initial fluorescence intensity is measured and the steady state fluorescence determined (Block 112). From those values, the diffusion coefficient, MSD equation and D(t) equation is calculated for the values (Block 114) and the process ends (Block 116).

While normal diffusion is a memoryless stationary ergodic random process, anomalous diffusion is dependent on the history of diffusion paths, which leads to a time-dependent diffusion coefficient, D(t). In current FRAP approaches to anomalous diffusion, the single power law is generally assumed, i.e., anomalous diffusion can be characterized by a time-dependent diffusion coefficient $D(t)=\Gamma t^{\alpha-1}$ with two parameters r and a that are referred to as a transport coefficient and anomalous exponent. However, the single power law assumption in anomalous diffusion may not be adequate. The new FRAP system in accordance with a non-limiting example operates without using the single power law assumption and permits the calculation of D(t) and MSD directly from values of the FRAP curve.

D Equation from FRAP Data: Normal Diffusion Application

In quantitative diffusion and FRAP analysis, a series of FRAP curves are generated by a FRAP equation for different diffusion coefficients, and fitted to the experimental FRAP data to obtain the best fitting D. When FRAP equations are nonlinear, this is a feasible method to find D. In the incorporated by reference Kang et al., Traffic article, a simplified version of the diffusion FRAP equation was disclosed as an efficient algebraic manipulation.

The simplified FRAP equation can be solved for D, thus deriving D directly from FRAP data. If $F(t_k)$ is considered the data point of a FRAP curve at the time $t=t_k$, it is possible to consider FRAP data as a collection of these fluorescence data points at a different time, i.e. $\{F(t_0), F(t_1), \ldots, F(t_N)\}$. It may be assumed there are normal diffusion kinetics with $t_0=0$, $F(t_k)$, which can be described by a normal diffusion FRAP equation:

$$F(t_k) = F_i\left(1 - \frac{K}{1+\gamma^2 + 2t_k/\tau_D}\right)M_f + (1-M_f)F_0 \quad (1)$$

where $F_i$ is the pre-bleach fluorescence intensity, $F_0$ is the initial post-bleach intensity, K is a bleaching depth parameter, $\tau_D = r_e^2/(4D)$ and $\gamma = r_n/r_e$ where $r_n$ is a nominal radius equivalent to the bleaching spot radius and $r_e$ is an effective radius measured from the radial distance in the post-bleach profile at $1/e^2$ depth.

As demonstrated in the previous study as disclosed in the Kang et al. *Traffic* article, accurate measurement of an effective radius, $r_e$, corresponding to the radial distance in the post-bleach profile at $1/e^2$ depth is important in quantitative FRAP analysis to compensate for diffusion during the photobleaching. It is possible to allow $f_{Data}(r)$ be the post-bleach profile data from the first image after photobleaching and as a result, $f_{Data}(r)$ can be described by:

$$f(r) = 1 - K\exp\left(-\frac{2r^2}{r_e^2}\right), \quad (S1)$$

where K is a bleaching depth parameter, r is the radial distance from the center and $r_e$ is the effective radius. Typically, $r_e$ can be determined by data fitting f(r) to the post-bleach profile for K and $r_e$. It is possible to derive a simple relation between $r_e$ and $r_{1/2}$, corresponding to the half width at the half depth and calculate $r_e$ directly from a easily measurable $r_{1/2}$ without data fitting. Since the maximum depth of the post-bleach profile, 1−K is achieved when =0, then $r_{1/2}$ satisfies $$\frac{2-K}{2} = 1 - K\exp\left(-\frac{2r_{1/2}^2}{r_e^2}\right), \quad (S2)$$

Solving for $r_e$, $$r_e = r_{1/2}\sqrt{\frac{2}{\ln 2}} \simeq 1.7 r_{1/2} \quad (S3)$$

Figure 3C:
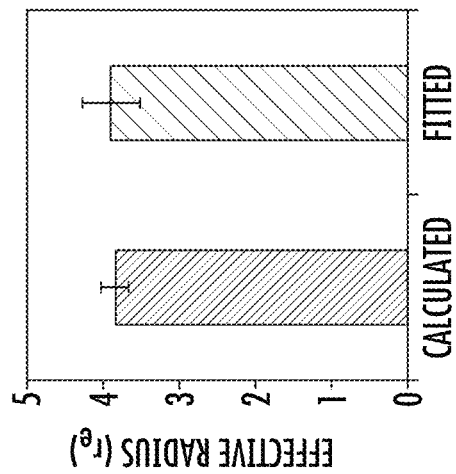
FIGS. 3A-3C are graphs and a bar chart showing the validation of the $r_e$ equation.

To validate $r_e$ equation (Eq. S2), a post-bleach profile may be generated by Eq. S1 using an arbitrarily chosen $r_e$ ($r_e=1$), and then $r_e$ may be calculated back from $r_{1/2}$ measured from the graph. As shown in the graph of FIG. 3A, the back-calculated $r_e$ (★) from measured $r_{1/2}$(■) exactly matches the value of the original $r_e$ (○) as expected. Next, to validate $r_e$ equation against experimental data, a set of post-bleach profile data of Alexa488 conjugated cholera toxin B-subunit (Alexa488-CTxB) was analyzed by curve fitting and the $r_e$ equation (Eq. S3).

Figure 3B:
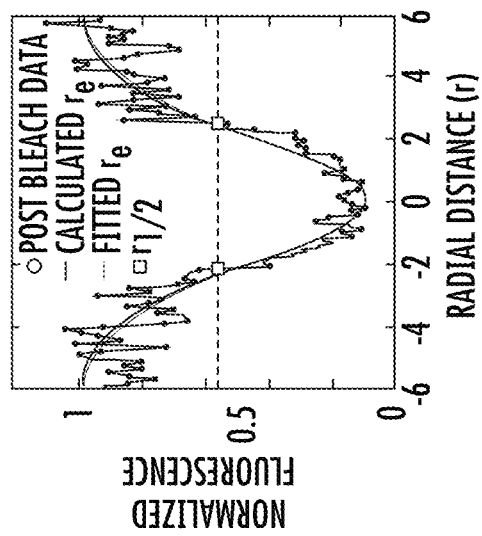
Figure 3A:
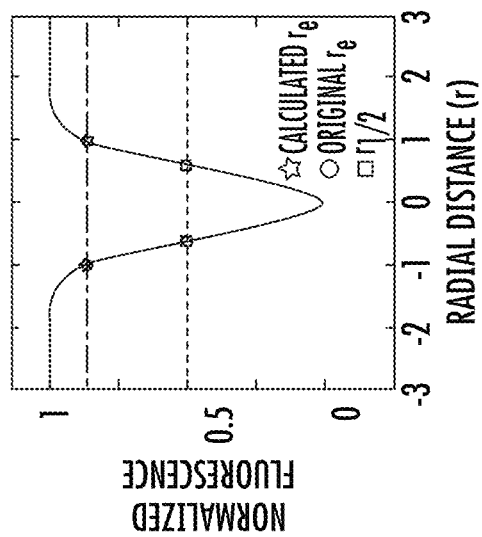

The graph of FIG. 3B shows a representative result, where two post-bleach curves (Eq. S1) with $r_e$ from curve fitting (solid grey) or from the $r_e$ equation (Eq. S3) using measured $r_{i/2}$ (■) and showing values close to each other. Statistical analysis on the set of $r_e$ either from curve fitting or calculation by $r_e$ equation (Eq. S3) revealed that there is no significant differences between two groups (Student t-test, <0.05, n=7), which indicates that both approaches are equally valid to abstract $r_e$ from the post-bleach data as shown in the bar graph of FIG. 3C. The system in accordance with a non-limiting example is more simple because it uses the $r_{1/2}$ measurement, which can be readily accomplished using most imaging software programs.

FIGS. 3A-3C validate the $r_e$ equation: FIG. 3A shows the numerical validation of the $r_e$ equation (Eq. S3), where $r_e=1$ was chosen in Eq. S1 for a post-bleach profile. FIG. 3B shows a comparison of the post-bleach profile curves from curve fitting and the $r_e$ equation (Eq. S3). FIG. 3C shows a comparison of $r_e$ from curve fittings and $r_e$ equation (Eq. S3). The error bars indicate mean sample standard deviations (n=7).

Also, $M_f=(F_\infty-F_0)/(F_i-F_0)$ is a mobile fraction and $F_\infty$ is post-bleach steady state fluorescence intensity. Since it is required that $F(0)=F_0$, at $t=0$ (i.e. $t_0=0$).

$$F_0 = F_i\left(1 - \frac{K}{1+\gamma^2}\right)M_f + (1-M_f)F_0$$

$$M_f F_0 = F_i\left(1 - \frac{K}{1+\gamma^2}\right)M_f$$

$$F_0/F_i = 1 - \frac{K}{1+\gamma^2}$$

$$K = (1 - F_0/F_i)(1+\gamma^2)$$

$$= \left(\frac{F_i - F_0}{F_i}\right)(1+\gamma^2)$$

It is possible to solve the diffusion FRAP equation (Eq. 1) for D.

$$\left(1 - \frac{K}{1+\gamma^2 + 2t_k/\tau_D}\right) = \frac{F(t_k) - (1-M_f)F_0}{F_i M_f}$$

$$\frac{K}{1+\gamma^2 + 2t_k/\tau_D} = \frac{M_f(F_i - F_0) - (F(t_k) - F_0)}{F_i M_f}$$

$$(1+\gamma^2) + 2t_k/\tau_D = \frac{KF_i M_f}{M_f(F_i - F_0) - (F(t_k) - F_0)}$$

$$\frac{1}{\tau_D}t_k = \frac{1}{2}\left(\frac{KF_i M_f}{M_f(F_i - F_0) - (F(t_k) - F_0)} - (1+\gamma^2)\right)$$

-continued

From $K = \left(\frac{F_i - F_0}{F_i}\right)(1 + \gamma^2)$ and $M_f = (F_\infty - F_0)/(F_i - F_0)$, $$\frac{1}{\tau_D} t_k = \frac{1}{2} \left( \frac{\left(\left(\frac{F_i - F_0}{F_i}\right)(1+\gamma^2) F_i \left(\frac{F_\infty - F_0}{F_i - F_0}\right)\right)}{\left(\frac{F_\infty - F_0}{F_i - F_0}\right)(F_i - F_0) - (F(t_k) - F_0)} - (1+\gamma^2) \right)$$

$$= \frac{(1+\gamma^2)}{2} \left(\frac{F(t_k) - F_0}{F_\infty - F(t_k)}\right)$$

Since $\tau_D = \frac{r_e^2}{4D}$ and $\gamma = \frac{r_e}{r_n}$, $$\frac{4D t_k}{r_e^2} = \frac{(r_e^2 + r_n^2)}{2 r_e^2} \left(\frac{F(t_k) - F_0}{F_\infty - F(t_k)}\right)$$

$$D = \frac{(r_e^2 + r_n^2)}{(8 t_k)} \left(\frac{F(t_k) - F_0}{F_\infty - F(t_k)}\right)$$

It is possible to let the diffusion coefficient computed from $k_{th}$ data point $F(t_k)$ be $D(t_k)$, then:

$$D(t_k) = \frac{(r_e^2 + r_n^2)}{8 t_k} \left(\frac{F(t_k) - F_0}{F_\infty - F(t_k)}\right), \quad (2)$$

which should be constant for normal diffusion and time-dependent otherwise.

Eq. 2 can be solved further for 4Dt, which yields the MSD equation for the diffusing molecules, $\langle x^2 \rangle = 4Dt$:

$$\langle x^2 \rangle = \frac{(r_e^2 + r_n^2)}{2} \left(\frac{F(t_k) - F_0}{F_\infty - F(t_k)}\right). \quad (3)$$

From the relation $$\frac{d}{dt}\langle x^2 \rangle = 4D,$$

it follows that:

$$D = \frac{d}{dt}\left[\frac{(r_e^2 + r_n^2)}{8}\left(\frac{F(t) - F_0}{F_\infty - F(t)}\right)\right] \quad (4)$$

$$D(t_k) = \frac{(r_e^2 + r_n^2)}{8}\left(\frac{F'(t_k)(F_\infty - F_0)}{[F_\infty - F(t_k)]^2}\right)$$

which provides an additional way to calculate $D(t_k)$ from FRAP data. However, Eq. 4 requires a numerical differentiation of FRAP data, $F'(t_k)$.

$D(t)$ equation from FRAP data: a single power law diffusion case, $D(t) = \Gamma t^{\alpha-1}$.

For a time dependent diffusion equation $u_t = D(t)(u_{xx} + u_{yy})$ with a single power law diffusion coefficient, $D(t) = \Gamma t^{\alpha-1}$, a time scale s which transforms the time dependent diffusion equation to a normal diffusion equation can be explicitly computed.

$$s = \int_0^t D(t) dt \quad (5)$$

$$\int_0^t \Gamma t^{\alpha-1} dt$$

$$\frac{1}{\alpha} \Gamma t^\alpha$$

Under the time scale s, the single power law anomalous diffusion can be described by $u_s = (u_{xx} + u_{yy})$ a normal diffusion equation with $D=1$. Therefore, a diffusion FRAP equation can be obtained from Eq. 1 as:

$$F(t_k) = F_i\left(1 - \frac{K}{1 + \gamma^2 + 2 t_k^\alpha / \tau_\Gamma}\right) M_f + (1 - M_f) F_0 \quad (6)$$

where $\tau_\Gamma = \alpha r_e^2/(4\Gamma)$. Similar to Eq. 2, by solving for $D(t_k) = \Gamma t_k^{\alpha-1}$, $$D(t_k) = \Gamma t_k^{\alpha-1} \quad (7)$$

$$= \frac{\alpha(r_e^2 + r_n^2)}{8 t_k}\left(\frac{F(t_k) - F_0}{F_\infty - F(t_k)}\right)$$

which also can be computed from Eq. 4. From the MSD in s-time scale (Eq. 5), $\langle x^2 \rangle = 4s$, the MSD in t is obtained as:

$$\langle x^2 \rangle = \frac{4}{\alpha} \Gamma t_k^\alpha \quad (8)$$

$$= \frac{4 t_k}{\alpha} D(t_k)$$

$$= \frac{(r_e^2 + r_n^2)}{2}\left(\frac{F(t_k) - F_0}{F_\infty - F(t_k)}\right)$$

which is precisely the same as the normal diffusion case (Eq. 3). Similarly, from the relation $$\frac{d}{dt}\langle x^2 \rangle = 4\Gamma t^{\alpha-1}$$

(Eq. 8), it follows that:

$$\Gamma t^{\alpha-1} = \frac{d}{dt}\left[\frac{(r_e^2 + r_n^2)}{8}\left(\frac{F(t) - F_0}{F_\infty - F(t)}\right)\right] \quad (9)$$

$$= \frac{(r_e^2 + r_n^2)}{8}\left(\frac{F'(t_k)(F_\infty - F_0)}{[F_\infty - F(t_k)]^2}\right)$$

which again requires a numerical differentiation of FRAP data, $F'(t_k)$ as in Eq. 4. $D(t)$ equation from FRAP data: a general time dependent diffusion coefficient case.

Because it is possible to postulate that anomalous diffusion within the cell membrane ($\mathbb{R}^2$) can be described by a diffusion equation with a certain time-dependent coefficient, $D(t)$, then the diffusion kinetics of fluorescence tagged molecules in a two dimensional plane are governed by:

$$\begin{cases} u_t = D(t)(u_{xx} + u_{yy}) \\ u(x, y, 0) = 1 - K \exp\left(-\frac{2(x^2 + y^2)}{r_e^2}\right), \end{cases} \quad (10)$$

where $u(x,y, 0)$ is the post-bleach profile after photobleaching. It is possible to introduce a new time scale as:

$$s = \int_0^t D(t)dt$$

then Eq. 10 can be converted into a normal diffusion equation with a diffusion coefficient, $D=1$;

$$\frac{\partial u}{\partial s} = \frac{\partial u}{\partial t}\frac{\partial t}{\partial s} \quad (11)$$
$$= (D(t)(u_{xx} + u_{yy}))\left(\frac{1}{D(t)}\right);$$
$$u_s = (u_{xx} + u_{yy}).$$

Therefore, it is possible to derive the corresponding FRAP equation in a new timescale:

$$F(s) = F_i\left(1 - \frac{K}{1 + \gamma^2 + 2s/\tau}\right)M_f + (1 - M_f)F_0 \quad (12)$$

where $\tau = r_e^2/4$. In the original time scale, t, $$F(t) = F_i\left(1 - \frac{K}{1 + \gamma^2 + 2\int_0^t D(t)dt/\tau}\right)M_f + (1 - M_f)F_0$$

By solving for $\int_0^t D(t)dt$;

$$\int_0^t D(t)dt = \frac{(r_e^2 + r_n^2)}{8}\left(\frac{F(t) - F_0}{F_\infty - F(t)}\right) \quad (13)$$

where $\tau = r_e^2/4$ and $\gamma = r_n/r_e$ were used. Finally, by differentiating with respect for t, $$D(t_k) = \frac{(r_e^2 + r_n^2)}{8}\left(\frac{F'(t_k)(F_\infty - F_0)}{[F_\infty - F(t_k)]^2}\right), \quad (14)$$

which is the same equation for normal diffusion and single power law anomalous diffusion (Eqs. 4,9). From the solution of Eq. 11, MSD can be calculated as:

$$\langle x^2 \rangle = 4s \quad (15)$$
$$= 4\int_0^t D(t)dt.$$

On the other hand, from Eqs. 13 and 15, the MSD equation in terms of FRAP data may be obtained as:

$$\langle x^2 \rangle = \frac{(r_e^2 + r_n^2)}{8}\left(\frac{F(t_k) - F_0}{F_\infty - F(t_k)}\right), \quad (16)$$

which is also identical to the case of normal diffusion and the single power law anomalous diffusion (Eqs. 3, 8). Importantly this observation indicates that for both normal diffusion and anomalous diffusion, the diffusion coefficient and MSD can be commonly found by the same equations (Eq. 14, 16). Additionally, the diffusion coefficient for normal diffusion can be found from MSD/(4t) as in Eq. 2.

Since $D(t_k)$ may be independent of time for normal diffusion, Eq. 2 or MSD/(4t) can also be used as a criterion to differentiate normal diffusion from anomalous diffusion. Iy may be apparent that MSD/(4t)=s/t from Eq. 15, the ratio between two different time scales is, $s=\int_0^t D(t)dt$ and t. The auxiliary equation, MSD/(4t) under different diffusion assumptions MSD can be calculated from the second momentum of the fundamental solution of a diffusion equation. For example, for a time-dependent diffusion coefficient, D(t), MSD is given by $\langle x^2 \rangle = 4\int_0^t D(t)dt$ (Eq. 15), while the MSD for normal diffusion is given by $\langle x^2 \rangle = 4Dt$.

Equivalently, MSD/(4t)=D may be for normal diffusion and MSD/(4t)=$\int_0^t D(t)dt$ may be for anomalous diffusion, respectively. The equation MSD/(4t) (Eq. 2) can distinguish normal and anomalous diffusion, and thus, it is possible to define MSD/(4t) as an auxiliary equation for D(t). Since MSD can be commonly found from FRAP data for both normal diffusion and anomalous diffusion without the single power law assumption (Eqs. 3, 8 and 16), the auxiliary equation, MSD/(4t) can also be evaluated from FRAP data as:

$$\frac{MSD}{4t} = \frac{(r_e^2 + r_n^2)}{8t}\left(\frac{F(t_k) - F_0}{F_\infty - F(t_k)}\right). \quad (17)$$

As observed (Eq. 3), MSD/(4t) provides D for normal diffusion:

$$\frac{MSD}{4t} = D.$$

On the other hand, the auxiliary equation for single power anomalous diffusion yields (Eq. 8):

$$\frac{MSD}{4t} = \frac{\frac{\Gamma}{\alpha}t^{\alpha-1}}{\frac{1}{\alpha}D(t)}, \quad (18)$$

which differs from the single power anomalous diffusion coefficient only by a constant scaling factor. Moreover, for a general D(t) other than a non-single power law anomalous diffusion, $$\frac{MSD}{4t} = \frac{\int_0^t D(t)dt}{t}.$$

These results further indicate that the graphs of MSD/(4t) (=s/t) from FRAP data (Eq. 17) with normal diffusion and single power law anomalous diffusion kinetics may show constant and exponential relation in time while the graphs of MSD/(4t) from anomalous diffusion without the single power law assumption will show neither of these. Therefore, MSD/(4t) can be used to differentiate normal diffusion, single power anomalous diffusion, and other types of anomalous diffusion directly from FRAP data without computing D(t). Since the D(t) calculation from FRAP data requires numerical differentiations (Eq. 4), and numerical differentiations often yield erroneous values with large fluctuations especially for noisy FRAP data, the auxiliary equation, MSD/(4t) can be a supplementary and alternative option to the D(t) equation. The auxiliary equation can be used for preliminary screening of normal diffusion, single power law anomalous diffusion, and non-single power law anomalous diffusion from FRAP data (Eq. 17) before applying the D(t) equation (Eq. 4, 9, 14) to determine a precise D(t).

Validation of D(t) Equation and the Auxiliary Equation for D(t)

Figure 4A:
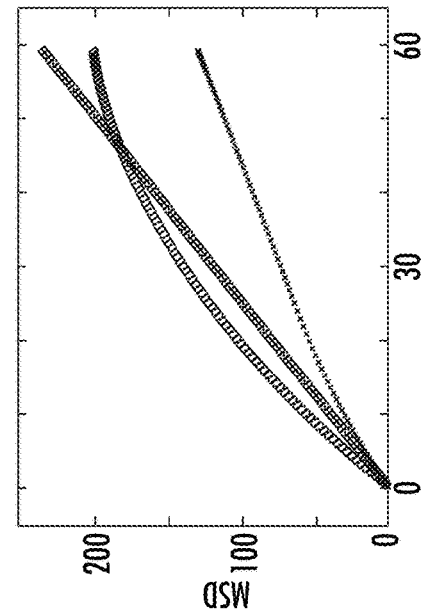
FIGS. 4A-4D are graphs showing a numerical validation of D(t) equations.
Figure 4B:
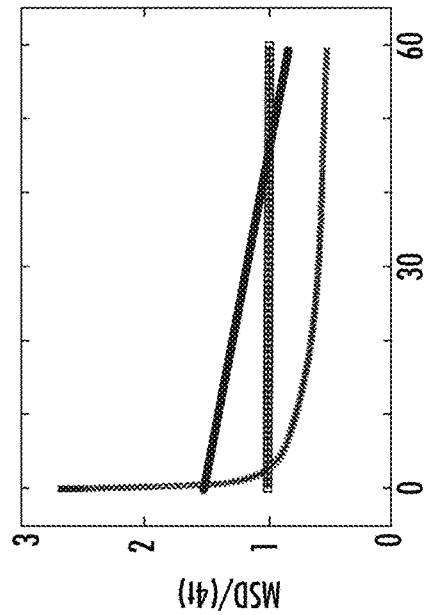

The D(t) equation may be validated numerically, referring to the FRAP curves as shown in FIGS. 4A-4D, which were generated using three different diffusion coefficients: (1) constant diffusion coefficient for normal diffusion, (2) $D(t)=\Gamma t^{\alpha-1}$ for single power law anomalous diffusion, and (3) D(t)=mt+b for a more arbitrary case of anomalous diffusion. For a fair comparison, the same parameters ($F_i$, $F_0$, $r_n$, $r_e$, K and $M_f$ in Eqs. 1, 12) except for D(t) were used to generate each of the FRAP curves (FIG. 4A). In FIG. 4B, theoretical MSD's were found by $\langle x^2 \rangle = 4\int_0^t D(t)dt$ (Eq. 15) from D or D(t) chosen to simulate FRAP curves, and compared with back-calculated MSD's from FRAP data using the MSD equation (Eq. 16).

Figure 4C:
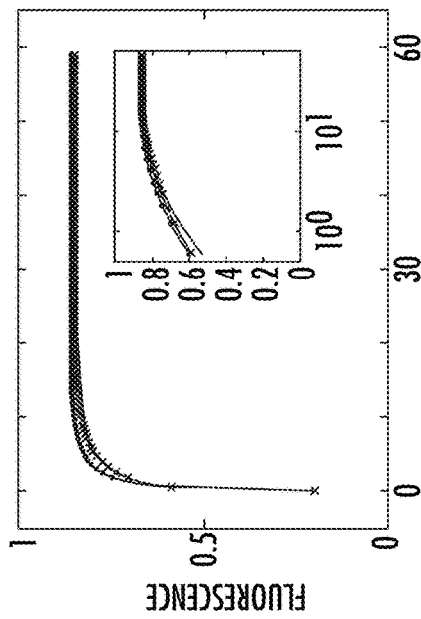

As expected, the back-calculated MSD's from FRAP data were identical to the theoretically expected MSD for all the D(t)'s or D considered. When D(t) or D was back-calculated from a FRAP curve by D(t) equations (Eqs. 4, 9, 14) and compared with the D(t)'s that were used to generate the FRAP curves, the match was not exact but reasonably good (FIG. 4C). The slight mismatch between theoretical D(t) and back-calculated D(t) is due to numerically approximated derivatives of FRAP curves (F'($t_k$) in D(t) equation). The same analysis was repeated for various combinations of different parameter values for $r_n$, $r_e$, $M_f$ and $F_0$ to show the system is valid independent of parametric variations as shown. The graph in FIG. 4D demonstrates that the auxiliary equation MSD/(4t) for D(t) can be use to differentiate underlying diffusion mechanisms using numerically simulated FRAP curves under different diffusion scenarios.

Figure 4D:
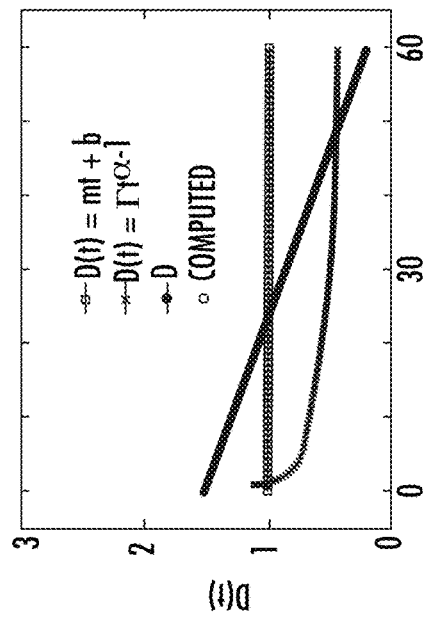

The Mean Squared Displacement (MSD) Computed from FRAP Data and the Graphs of an Auxiliary Equation, MSD/(4t) for D(t) Reveals Various Modes of Anomalous Diffusion As shown in Eqs. 3, 8, and 16, MSD can be directly calculated from FRAP data by the same formula regardless of the underlying diffusion mechanism. Additionally, the graphs in FIGS. 4C and 4D show that in theory, the auxiliary equation (MSD/4t) can be used as a criteria to differentiate membrane proteins undergoing normal diffusion from those undergoing anomalous diffusion directly from FRAP data.

These theoretical predictions may be confirmed by investigating FRAP data of several membrane proteins and lipid anchored probes as explained in the incorporated by reference article to Day et al. as shown by the Alexa488-conjugated Cholera toxin B subunit (Alexa488-CTxB), YFP-GL-GPI, YFP-GT46, and DiI16 (FIG. 1A). CTxB is commonly studied as a potential marker of lipid rafts, and CTxB is a homopentameric protein containing binding sites for 5 GM1 gangliosides. Once attached to the gangliosides, it displays slow diffusion, resulting at least in part from its ability to be indirectly confined by cortical actin.

YFP-GL-GPI is an engineered protein that includes yellow fluorescent protein (YFP) attached to a single GPI lipid anchor. Like CTxB, YFP-GL-GPI is localized to the outer leaflet of the plasma membrane and is sensitive to the presence of cortical actin and may be raft-associated. However, YFP-GL-GPI displays much faster diffusion than CTxB. The YFP-GT46 was selected as a representative transmembrane protein.

GT46 is an artificial protein containing a consensus N-glycosylation site, the transmembrane domain from the LDL receptor, and the cytoplasmic tail from CD46. It displays slow diffusion similar to CTxB, but is not considered a raft component. Finally, DiIC16 is a small fluorescent molecule tagged with two 16 carbon hydrocarbon chains, similar to those found on many native phospholipids. DiIC16 displays fast diffusion possibly due to its small size and inability to be restricted by cytoskeleton.

Figure 1C:
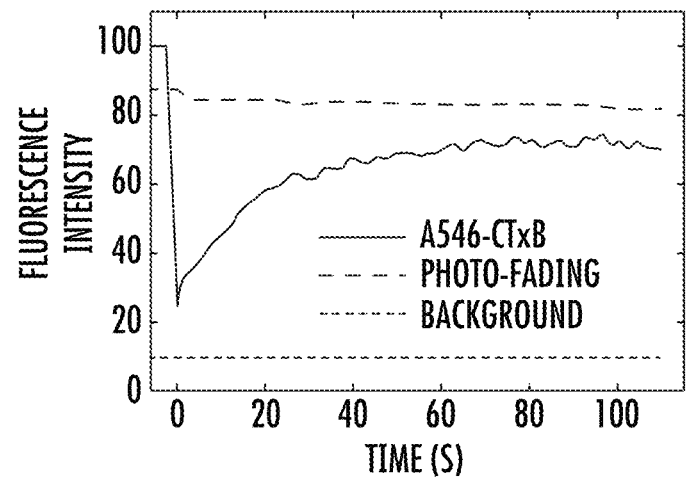
Figure 1D:
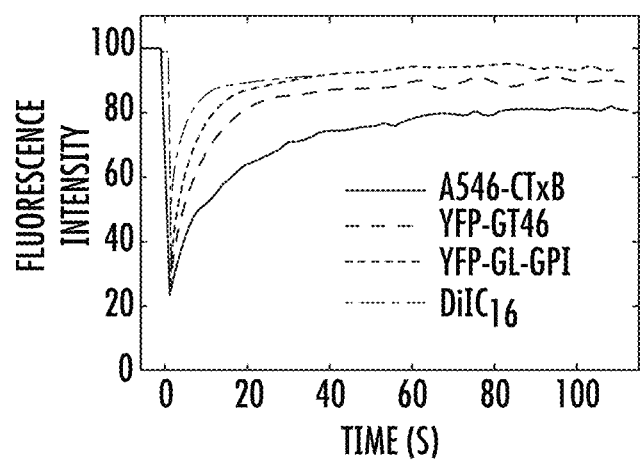

Representative FRAP curves of these membrane-associated molecules are shown in FIGS. 1C and 1D. To account for dramatic differences in diffusion between these molecules, the frame rate at which FRAP recovery was monitored was altered between the molecules to maximize data points inside the recovery while minimizing photofading. Therefore, recovery of CTxB, GLGPI, and GT46 was imaged every 1.93 seconds, while DiIC16 recovery was measured at one frame every 0.071 seconds. For analysis, the FRAP curves were corrected for photofading (FIGS. 1C and 1D), where reference is made to the article by Day et al., "Analysis of Protein and Lipid Dynamics Using Confocal Fluorescence Recovery After Photobleaching (FRAP)," *Current Protocols in Cytometry*, 2012, Chapter 2, Unit 2.19, the disclosure which is hereby incorporated by reference in its entirety. The detailed FRAP data analysis steps are summarized in the block flow diagram of FIG. 2.

Figure 5A:
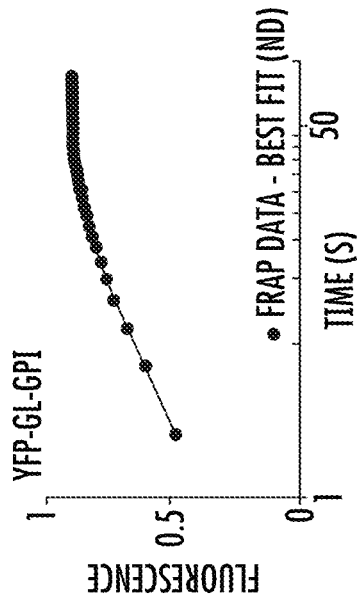
FIGS. 5A-5L are graphs showing how the MSD and MSD/(4t) are calculated from FRAP data.
Figure 5B:
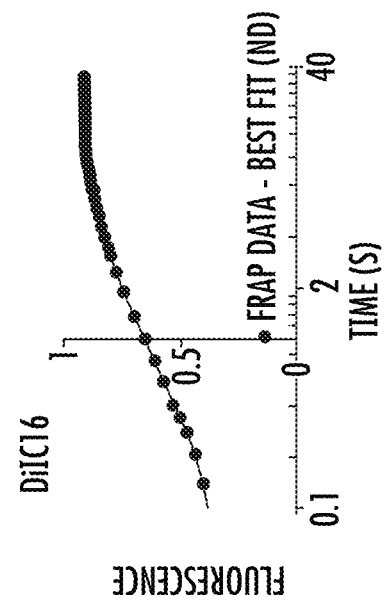
Figure 5C:
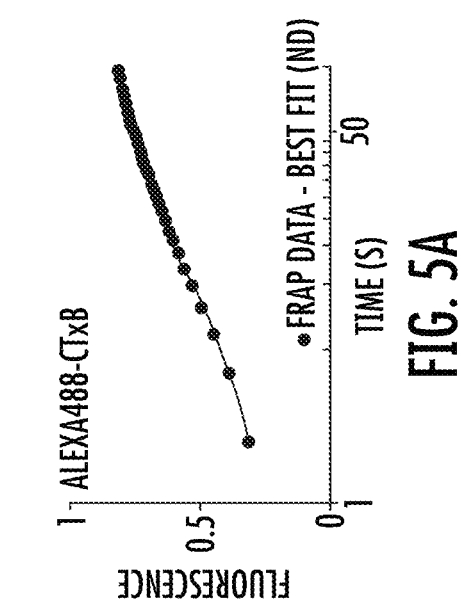
Figure 5D:
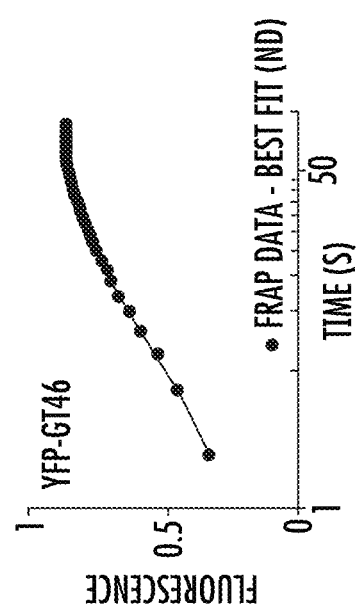
Figure 5E:
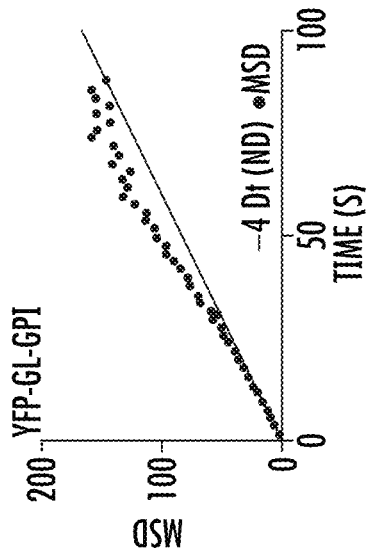
Figure 5F:
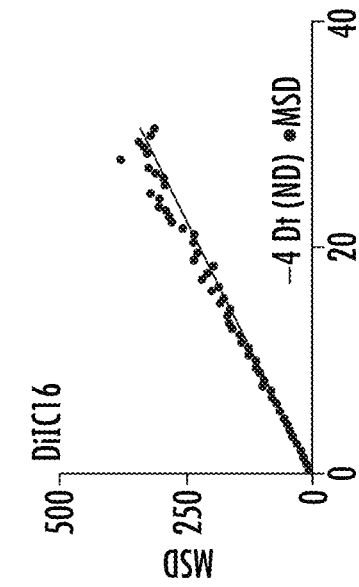
Figure 5G:
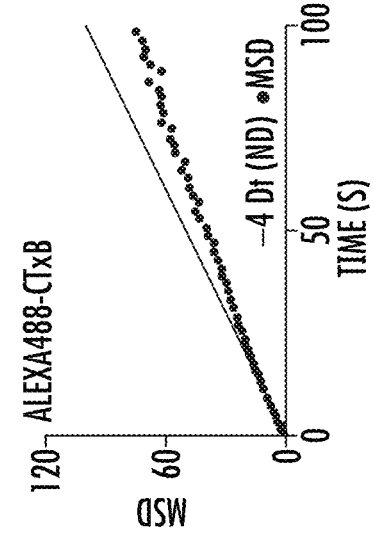
Figure 5H:
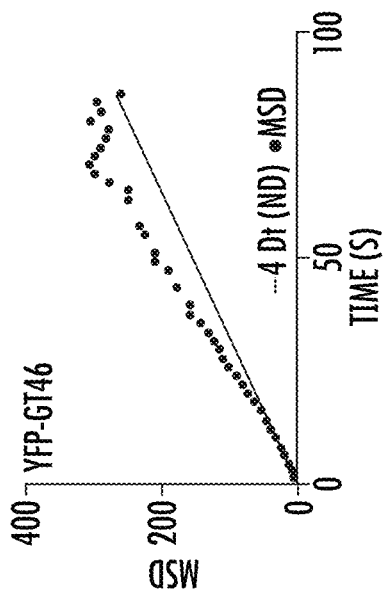

The data was fitted with the normal diffusion FRAP equation (Eq. 1). As shown in the graphs of FIGS. 5A-5D, the normal diffusion FRAP model fit the FRAP data for all four examined molecules. Using data fitting to the normal diffusion FRAP model (Eq. 2), the diffusion coefficients were calculated to be 0.17±0.12 $\mu m^2/s$ (n=63) for Alexa488-CTxB (FIG. 5A), 1.18±0.49 $\mu m^2/s$ (n=127) for YFP-GL-GPI (FIG. 5B), 0.54±0.18 $\mu m^2/s$ (n=63) for YFP-GT46 (FIG. 5C), and 2.54±0.78 $\mu m^2/s$ (n=176) for DiIC16 (FIG. 5D).

These diffusion coefficients were used to make plots for MSD=4Dt and the resulting plots were compared to MSD calculated from FRAP data by the common MSD equation (Eq. 3, 8 and 16). It was expected that the two plots would show good agreement when a membrane molecule's diffusion was normal, while they would show a discrepancy for anomalous diffusion. As shown in FIGS. 5E-5H, only DiIC16 showed good agreement with a linear MSD line (MSD=4Dt). This result indicated that normal diffusion is a dominant lateral diffusion mechanism for the DiIC16 lipid as expected. Different from DiIC16, the MSD of Alexa488-CTxB was below the theoretical normal diffusion MSD line, implying anomalous subdiffusion. This is possibly due to the large CTxB/GM1 complex being restricted by contact with other membrane structures.

Both the MSD curves of YFP-GL-GPI and YFP-GT46 appeared above the normal diffusion MSD line. This finding indicated anomalous superdiffusion possibly due to some facilitating mechanisms for diffusion of these proteins. Since MSD curves of YFP-GL-GPI and YFP-GT46 decrease back to the linear MSD lines, the mechanism that causes the proteins to undergo anomalous superdiffusion was transient and the particles participated in normal diffusion. This temporal switch between two modes of diffusion may elucidate further the mechanisms responsible for this phenomena. This effect was more pronounced for the transmembrane protein, YFP-GT46 than for the GPI-anchored protein, YFP-GL-GPI.

The curves shown in FIGS. 5E-5H illustrate that the MSD's of Alexa488-CTxB, YFP-GL-GPI, and YFP-GT46 deviate from theoretical normal diffusion MSD lines, therefore indicating anomalous diffusion. It is not clear if the MSD's of these trans-membrane or lipid anchored membrane proteins will show either a nonlinear relationship in time, a linear relationship with different slopes, or a combination of both normal and anomalous diffusion. FRAP curves were further transformed using the auxiliary equation (Eq. 17) to distinguish single power anomalous diffusion from a more complex anomalous diffusion mechanism.

As shown in FIG. 5D, the auxiliary equation, MSD/(4t) (Eq. 17) transforms FRAP curves into a constant line for a normal diffusion mechanism and an exponential curve for a single power law anomalous diffusion mechanism. Therefore, if the graph of a computed MSD/(4t) equation is neither a constant nor a simple exponential curve, it may indicate multiple underlying factors contribute to the protein's anomalous diffusion mechanism. While DiIC16 showed a constant MSD/(4t) value plotted near MSD/(4t)≅D implying normal diffusion (FIG. 5L), the other examined molecules show MSD/(4t) values that change over time implying anomalous diffusion.

Figure 5J:
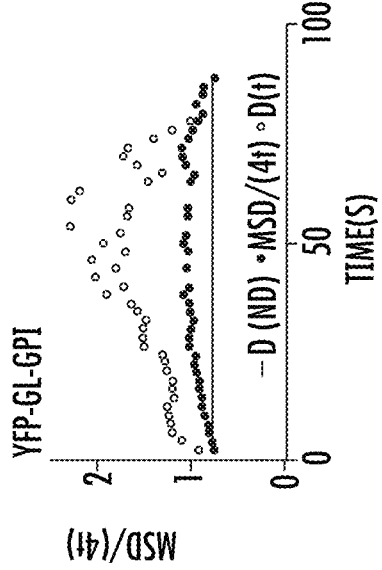
Figure 5L:
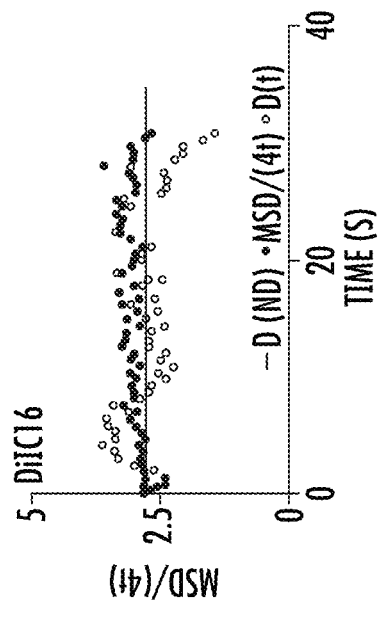
Figure 5I:
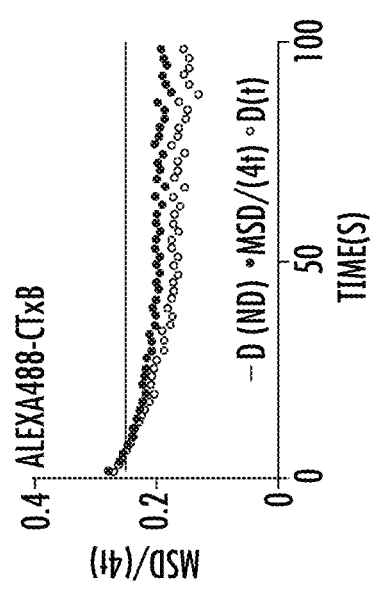
Figure 5K:
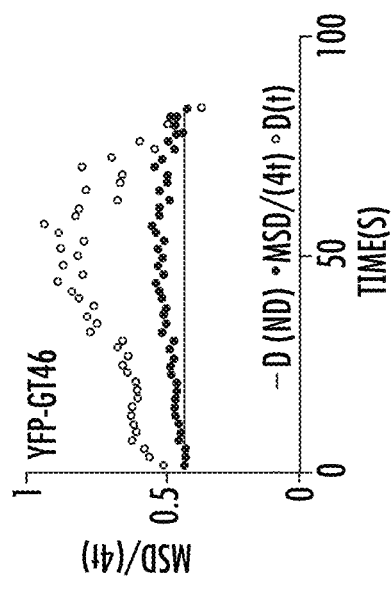

In particular, Alexa488-CTxB data showed a single exponential curve with a negative exponent indicating a single power law anomalous subdiffusion (FIG. 5I). MSD/(4t) curves from YFP-GL-GPI and YFP-GT46 FRAP data, on the other hand, had two phases, i.e., anomalous super diffusion followed by recovery to normal diffusion. This shift in diffusion modes is not described by a single power law anomalous diffusion (FIGS. 5J-5K, ●).

To confirm the predictions made from the auxiliary equation, MSD/(4t), D(t)'s of Alexa488-CTxB, YFP-GL-GPI, YFP-GT46, and DiIC16 were calculated from the common D(t) equation (Eqs. 4, 9 and 14) and the graphs of the calculated D(t)'s were plotted in FIGS. 3I-3L (□). The common D(t) equation (Eqs. 4, 9 and 14) was in the same form regardless of underlying assumptions about diffusion kinetics and therefore was applicable to any types of underlying diffusion mechanisms including normal diffusion, single power law anomalous diffusion and other types of anomalous diffusion. Since even small fluctuations can cause large differences in the values of derivatives, however, the common D(t) equation was better suited for a FRAP curve with less noise. Usually, a FRAP curve has less noise in the early stages of recovery than in the later stage where recovery is approaching the steady state. Also, an averaged multiple FRAP curves is less noisy than a FRAP curve from a single FRAP experiment. Because of this, the common D(t) equation (Eqs. 4, 9 and 14) was applied to averaged FRAP curves from more than 15 FRAP experiments.

Since both Eqs. 2 and 4 yield a constant diffusion coefficient independent of time for DiIC16, it was expected that D(t) of DiIC16 calculated from Eq. 4 would overlap with the graph of the auxiliary equation MSD/(4t) (Eq. 2). Although the calculated D(t) of DiIC16 showed fluctuations due to noises, overall, both Eqs. 2 and 4 gave results in good agreement (FIG. 5L, ● vs. □).

On the other hand, Eqs. 8 and 9 indicate that MSD/(4t) and D(t) from a single power law anomalous diffusion are not equal but differ by constant multiplication as shown in Eq. 18. Since Alexa488-CTxB exhibited single power law anomalous subdiffusion, this prediction was tested by using Alexa488-CTxB FRAP data. Comparison of MSD/(4t) and D(t) of Alexa488-CTxB calculated by Eqs. 8 and 9 not only validated this prediction, but also suggested that Alexa488-CTxB had single power law anomalous subdiffusion (FIG. 5I, ● vs. □).

In the case of YFP-GL-GPI and YFP-GT46, the graphs of D(t) show similarities with those of the auxiliary equation, MSD/(4t) (FIGS. 5J-5K, ● vs. □). Two phases of anomalous diffusion were more pronounced with larger fluctuations in the D(t) plot than the MSD/(4t) plot in both YFP-GL-GPI and YFP-GT46 (FIGS. 5J-5K, ● vs. □). This further indicated that YFP-GL-GPI and YFP-GT46 experience anomalous diffusion cannot be described by a single power law anomalous diffusion model. Thus, the MSD/(4t) curves demonstrated that anomalous diffusion mechanisms existed in cell membranes beyond normal diffusion or a single power law anomalous subdiffusion (FIGS. 5J-5K).

The graphs of FIGS. 5A-5L indicate that MSD and MSD/(4t) are calculated from FRAP data (FIGS. 5A-5D) and the FRAP data of Alexa488-CTxB, YFP-GL-GPI, YFP-GT46, and DiIC16 and the best fitting normal diffusion FRAP curves. Overall, a normal diffusion FRAP model described FRAP data well as shown in FIGS. 5E-5H. Comparison of the linear MSD relation (–: MSD=4Dt for normal diffusion) and computed MSD from FRAP data of Alexa488-CTxB, YFP-GL-GPI, YFP-GT46, and DiIC16 by Eq.16 (●). The best fitting D's from FIGS. 5A-5D were used to generate the MSD=4Dt plot.

While DiIC16 showed good agreement with normal diffusion MSD, the other membrane proteins showed deviation from normal diffusion MSD, which further suggested single power law anomalous diffusion for CTxB and unspecified anomalous diffusion for YFP-GL-GPI, YFP-GT46 (FIGS. 5I-5L). The best fitting D's from FIGS. 5A-5D and the graphs of an auxiliary equation MSD/4t (●) or the graphs D(t) (□) calculated from FRAP data of Alexa488-CTxB, YFP-GL-GPI, YFP-GT46, and DiIC16 are compared. For MSD, Eq. 3, 8, and 16 were used and for D(t), Eq. 4, 9, and 14, which were essentially identical regardless of assumptions on the underlying diffusion kinetics. D(t) and MSD/4t plots suggested normal diffusion for DiIC16, single power law anomalous diffusion for CTxB and unspecified anomalous diffusion for YFP-GL-GPI, and YFP-GT46.

The graphs of an auxiliary equation, MSD/4t may distinguish normal diffusion and single power law anomalous diffusion from other types of non-single power law anomalous diffusion. The values of best fitting parameters [k, $r_e$, $r_n$, $f_\square$, $M_f$, $f_0$] are summarized in Table 1.

TABLE 1

Best Fitting Parameters, k, $r_e$, $r_n$, $f_\infty$, $M_f$ and $f_0$ for FRAP Data

|  | Alexa488-CTx | YFP-GL-GPI | YFP-GT46 | DiIC16 |
| --- | --- | --- | --- | --- |
| k (Mean ± STD) | 0.99 ± 0.05 | 0.90 ± 0.07 | 1.02 ± 0.05 | 0.86 ± 0.10 |
| $r_e$ (Mean ± STD) | 4.21 ± 0.31 | 4.41 ± 0.44 | 4.18 ± 0.27 | 4.33 ± 0.73 |
| $r_n$ (fixed) | 2.05 | 2.05 | 2.05 | 2.05 |
| $f_\infty$ (Mean ± STD) | 0.91 ± 0.06 | 0.93 ± 0.08 | 0.90 ± 0.08 | 0.93 ± 0.07 |
| $M_f$ (Mean ± STD) | 0.89 ± 0.01 | 0.90 ± 0.01 | 0.88 ± 0.02 | 0.90 ± 0.01 |
| $f_0$ (Mean ± STD) | 0.19 ± 0.04 | 0.26 ± 0.06 | 0.17 ± 0.04 | 0.31 ± 0.06 |
| n | 63 | 127 | 63 | 176 |

Comparison of Single Power Low Anomalous Subdiffusion Model and New FRAP System

It is possible to compare the new FRAP system with the conventional single power law anomalous subdiffusion approach by analyzing the same FRAP data with a single power law anomalous subdiffusion FRAP model (Eq. 6) and compare the best fitting diffusion coefficient, $D(t)=\Gamma t^{\alpha-1}$ with D(t) computed from the common D(t) equation (Eqs. 4, 9 and 14). This may be accomplished using two different approaches. In a first approach, it is possible to calculate D(t) from FRAP data of Alexa488-CTxB, YFP-GL-GPI, YFP-GT46, and DiIC16 using the common D(t) equation (Eq. 4, 9, and 14).

The D(t)graphs are fitted to a single power law anomalous subdiffusion coefficient, $\Gamma t^{\alpha-1}$ for $\Gamma$ and $\alpha$ (FIGS. 6A-6D: ○). FRAP curves were then generated using the best fitting single power law diffusion coefficients ($D(t)=\Gamma t^{\alpha-1}$) The resulting FRAP curves were compared with the original FRAP data that was used to calculate D(t) (FIGS. 6E-6H: ○). In the second approach, a single power law anomalous subdiffusion coefficient, $\Gamma t^{\alpha-1}$ was found by fitting a single power law FRAP model (Eq. 6) to the same FRAP data (FIGS. 6E-6H: ●) that were used to calculate D(t)'s.

If underlying diffusion mechanisms of membrane proteins or lipid probes are normal or are of single power law anomalous diffusion, the resulting $\Gamma t^{\alpha-1}$ should be similar regardless of the different approaches taken. As expected, a single power law is able to describe D(t) of Alexa488-CTxB and DiIC16 (FIGS. 6A-6D: ● vs. ○). Also, FRAP curves generated with $\Gamma t^{\alpha-1}$ from the two different approaches fit the FRAP data equally well (FIGS. 6E-6H: ● vs. ○). The single power law anomalous subdiffusion parameter pairs ($\Gamma$, a) found from the two different approaches showed no significant differences (FIGS. 6I-6L: Paired t test, n=10, p<0.05).

Figure 6B:
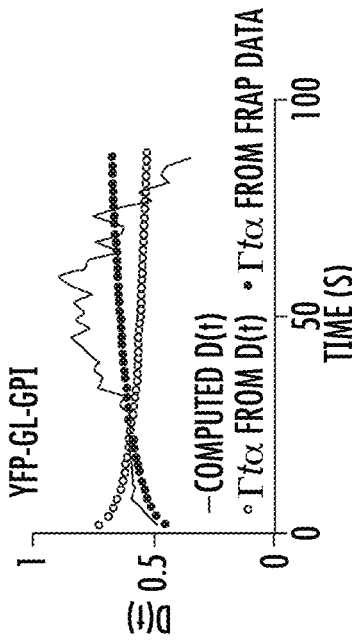
FIGS. 6A-6L are graphs and bar charts showing the computed D(t) versus the MSD/(4t).
Figure 6D:
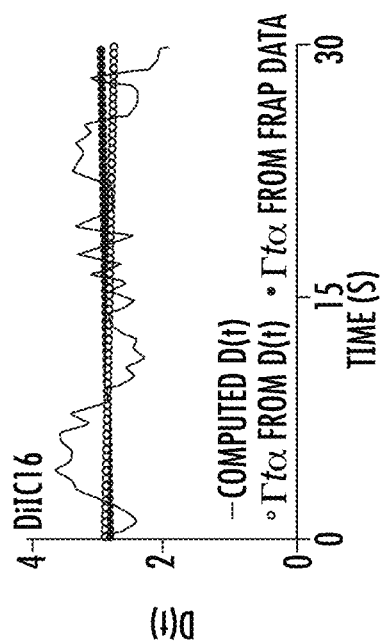
Figure 6A:
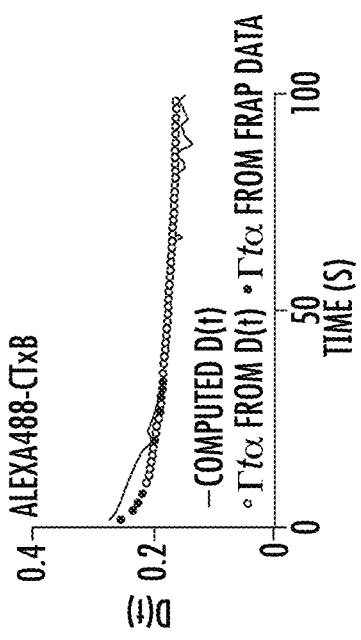
Figure 6C:
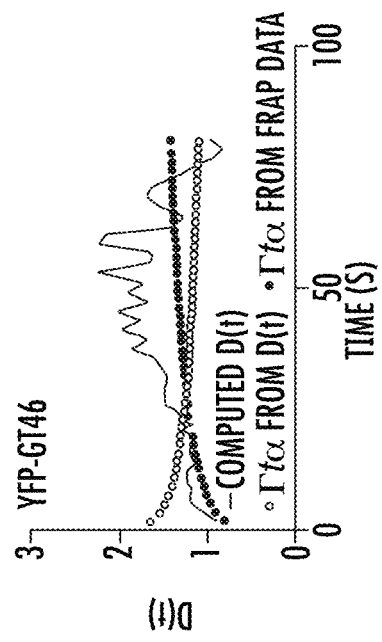
Figure 6E:
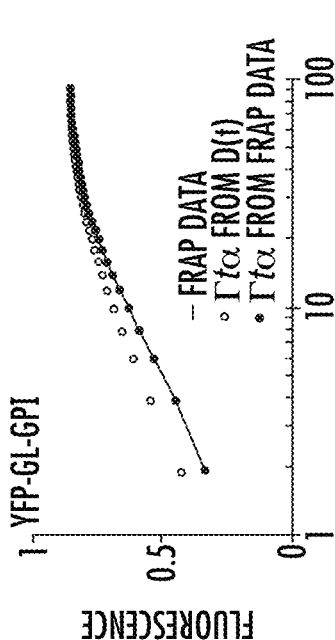
Figure 6F:
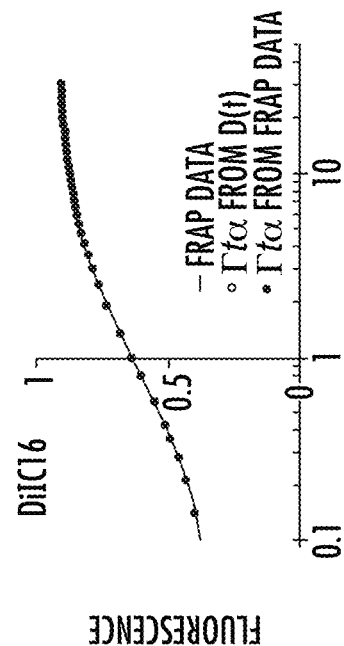
Figure 6G:
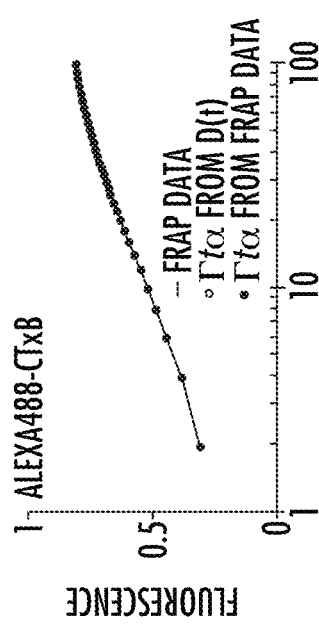
Figure 6H:
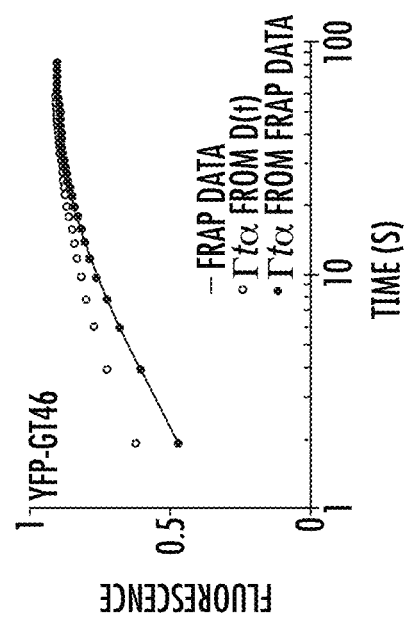
Figure 6J:
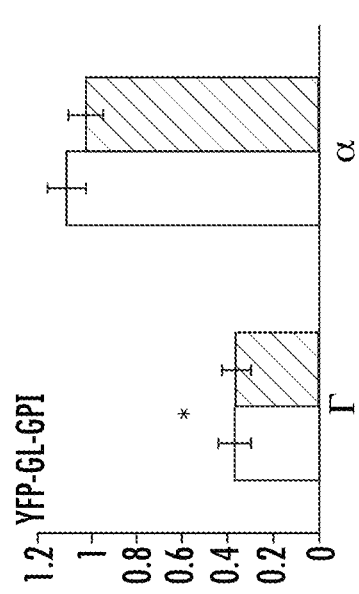
Figure 6L:
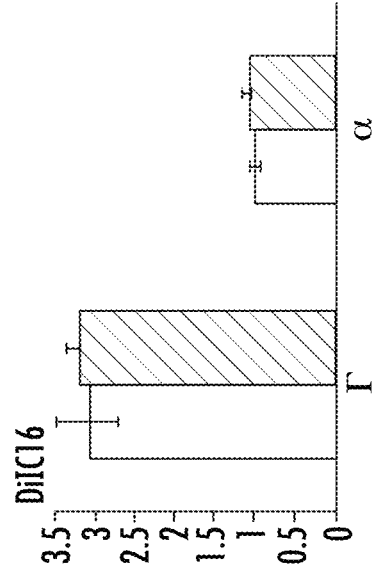
Figure 6I:
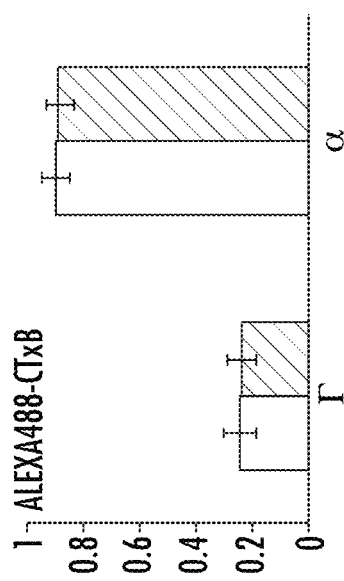
Figure 6K:
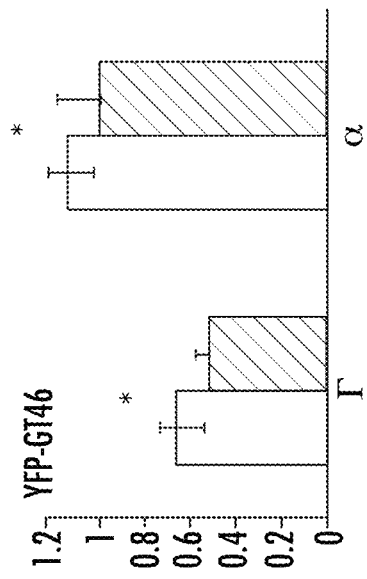

In contrast, D(t) of YFP-GL-GPI and YFP-GT46 may not be described by a single power law anomalous diffusion coefficient (FIGS. 6B-6C: ● vs. ○) and therefore, there were significant differences in $\Gamma t^{\alpha-1}$ from two different approaches (FIGS. 6J-6K: n=10, p<0.05). While $\Gamma t^{\alpha-1}$ found from fitting to the FRAP data showed anomalous superdiffusion with $\alpha>1$, $\Gamma t^{\alpha-1}$ and found from fitting to D(t) that it showed anomalous subdiffusion with $0<\alpha<1$ for both YFP-GL-GPI and YFP-GT46 (FIGS. 6B, 6C, 6J, 6K).

In both cases, a single power law is not able to describe D(t) satisfactorily (FIGS. 6B-6C: vs. ● vs. -). When FRAP curves generated using $\Gamma t^{\alpha-1}$ from the two different approaches were compared, $\Gamma t^{\alpha-1}$ obtained from fitting to D(t) showed a large deviation from the experimental FRAP curve, while $\Gamma t^{\alpha-1}$ found from fitting to the FRAP data showed excellent fits (FIGS. 6F-6G: ● vs. ○).

Referring again to FIGS. 6A-6L and as noted before, there are illustrated graphs and bar charts to show computed D(t) versus MSD/(4t). In FIGS. 6A-6D, D(t)'s were computed from FRAP data of FIG. 6A showing Alexa488-CTxB, FIG. 6B showing YFP-GL-GPI, FIG. 6C showing YFP-GT46, and FIG. 6D showing DiIC16, by Eq. 4, 9, and 14 (-) and fitted to a single power law anomalous subdiffusion coefficient, $\Gamma t^{\alpha-1}$ for $\Gamma$ and $\alpha$ (○). Also, $\Gamma t^{\alpha-1}$ was found by fitting a single power law anomalous diffusion FRAP model (Eq. 6) to FRAP data for $\Gamma$ and $\alpha$ (●). D(t)'s of Alexa488-CTxB and DiIC16 were in good agreement with single power law anomalous diffusion coefficients, while D(t)'s of YFP-GL-GPI and YFP-GT46 could not be described by single power law anomalous diffusion coefficients.

As shown in FIGS. 6E-6H, FRAP curves were generated with $\Gamma t^{\alpha-1}$ and found either by fitting $\Gamma t^{\alpha-1}$ to the calculated D(t) by Eq. 4, 9, and 14 (○) or fitting a single power FRAP equation to FRAP data for $\Gamma$ and $\alpha$ (●) and then compared with FRAP data (-). The single power law anomalous diffusion coefficients from two different approaches successfully described FRAP data of Alexa488-CTxB and DiIC16 equally well, but showed a large discrepancy in describing FRAP data of YFP-GL-GPI and YFP-GT46 as shown in FIGS. 6I-6L.

Comparison of $\Gamma t^{\alpha-1}$ found by fitting $\Gamma t^{\alpha-1}$ to the calculated D(t) by Eq. 4, 9, and 14 (□) or fitting a single power FRAP equation to FRAP data for $\Gamma$ and $\alpha$ (■). The asterisk represents significant difference; p-value <0.05. The single power law anomalous diffusion coefficients from the two different approaches were similar for Alexa488-CTxB and DiIC16, which undergo either single power law anomalous diffusion or normal diffusion. However, single power law anomalous diffusion coefficients from the two different approaches were significantly different for YFP-GL-GPI and YFP-GT46, which cannot be described by single power law anomalous diffusion. The values of best fitting parameters [k, $r_e$, $r_n$, $f_\infty$, $M_f$, $f_0$] are summarized in Table 1.

The Akaike Information Criterion (AIC) for model selection was applied to compare the single power law model approach and the new D(t) system as described. In general, AIC is calculated by:

$$AIC = 2k - 2\ln(\hat{L}).$$

where k is the number of estimated parameters in the model and $\hat{L}$ is the maximum value of the likelihood function for the model. While 2k measures the complexity of a model, 2 ln($\hat{L}$) measures the goodness of fit. For conventional least squares regression with normally distributed errors, AIC can be simplified by:

$$AIC = 2k + n\ln(\sigma^2).$$

where $\sigma^2$=(residual sum of squares)/n for sample size n.

While some parameters, $F_i$, k, $r_e$, $r_n$, $F_\infty$, $M_f$, and $F_0$ are shared by both approaches, the single power law approach has additional two parameters $\Gamma$ and $\alpha$ (k=9). On the other hand, the new FRAP system, in accordance with a non-limiting example, requires different D for each time point $t_i$ where i=1, 2, . . . , n corresponding n parameter (k=n+7). Since the new FRAP system has a large number of parameters (n/k<40), it is desirable to use a modified version of AIC ($AIC_c$):

$$AIC_c = 2k + n\ln(\sigma^2) + \frac{2k(k+1)}{n-k-1}.$$

Both the single power law model and the new FRAP system yielded negative AICc values for the FRAP data of Alexa488-CTxB, YFP-GL-GPI, YFP-GT46, and DiIC16 as shown in Table 2, indicating that both are good models. However, the new FRAP system yields greater negative values in all cases and therefore is a better model even for a large number of parameters ($D(t_k)$) for each time point. It is evident that application of the AIC to FRAP data and the new D(t) yields a negative value below −6000, even for DiIC16.

TABLE 2

Modified Akaike Information Criterion ($AIC_c$) for Model Selection Between the Single Power Law Anomalous Subdifussion Model (Single Power Law) and the New FRAP System as New D(+)

| Proteins/Lipid probes | Model | k | n | Residual sum of squares | $AIC_c$ |
|---|---|---|---|---|---|
| Alexa488-CTxB | Single power law | 9 | 63 | 3.8906e−04 | −656.1 |
| | New D(t) | 63 | 63 | 5.4542e−31 | −10700 |

TABLE 2-continued

Modified Akaike Information Criterion (AIC$_c$) for Model Selection Between the Single Power Law Anomalous Subdifussion Model (Single Power Law) and the New FRAP System as New D(+)

| Proteins/Lipid probes | Model | k | n | Residual sum of squares | AIC$_c$ |
|---|---|---|---|---|---|
| YFP-GL-GPI | Single power law | 9 | 57 | 0.0012 | −590.5 |
| | New D(t) | 57 | 57 | 1.5407e−32 | −10904 |
| YFP-GT46 | Single power law | 9 | 57 | 0.0014 | −582.1 |
| | New D(t) | 57 | 57 | 7.7808e−32 | −10811 |
| DiIC16 | Single power law | 9 | 442 | 8.9684e−04 | −5775.3 |
| | New D(t) | 442 | 442 | 1.2634e−31 | −424870 |

The new FRAP system showed excellent agreement with a single power law FRAP model for proteins that undergo either normal or single power law subdiffusion as in the case for Alexa488-CTxB and DiIC16. However, the discrepancies in YFP-GL-GPI and YFP-GT46 further indicate that YFP-GL-GPI and YFP-GT46 undergo anomalous diffusion kinetics that is not a single power law anomalous diffusion. This suggests that the single power law anomalous diffusion assumption may not be sufficient to describe various types of D(t) of membrane proteins.

Discussion

As noted before, FRAP was developed to study the diffusion of proteins on cell membranes over four decades ago, and it has improved significantly since that time, both technically and theoretically. With the improvements, researchers have learned the complexity of diffusion processes in live cells and within cell membranes, and realized that normal diffusion often fails to describe biological diffusion. Diffusion in live cells often displays anomalous diffusion and many efforts to have been made to detect this process.

In one area of research, a single power law diffusion coefficient, $D(t)=\Gamma t^{\alpha-1}$, was developed to describe anomalous diffusion in terms of an anomalous diffusion coefficient, $\Gamma$ and anomalous diffusion exponent, $\alpha$. This approach represented a generalization of normal diffusion in the sense that normal diffusion is a special case of a single power law diffusion coefficient for $\alpha=1$. For $0<\alpha<1$.

A single power law describes a subdiffusion with the mean square displacement (MSD) $\sim t^\alpha < t$ while in the case of $\alpha>1$, a single power law describes a subdiffusion with the mean square displacement (MSD) $\sim t^\alpha > t$. As a consequence, a single power law fails to describe complex diffusion kinetics with multiple modes, e.g., a combination of normal and anomalous diffusion or transition from one mode of diffusion kinetics to another.

The new FRAP system in accordance with a non-limiting example may be used to calculate time-dependent diffusion coefficients, D(t) and MSD from FRAP data without a single power law assumption and applies the results to the study of various membrane-associated molecules with distinct diffusion kinetics. The results show a good agreement with the single power law FRAP model for proteins undergoing either normal (DiIC16) or single power law anomalous diffusion (Alexa488-CTxB).

The new FRAP system detects new types of anomalous diffusion in YFP-GL-GPI and YFP-GT46, which appear to be a combination of different modes of normal and anomalous diffusion. In these cases, a single power law FRAP model showed anomalous superdiffusion with $\alpha>1$ while the new FRAP system showed superdiffusion followed by subdiffusion (FIGS. 5J-5K). Since the results from the new FRAP system showed excellent agreement with a single power law FRAP model in the case of normal diffusion (DiIC16) or a single power law subdiffusion (Alexa488-CTxB), the diffusion kinetics of YFP-GL-GPI and YFP-GT46 are therefore neither normal diffusion nor a single power anomalous diffusion.

Reference is made to the article by Adler et al., "Conventional Analysis of Movement on Non-Flat Surfaces Like the Plasma Membrane Makes Brownian Motion Appear Anomalous," Communications Biology, 2019; 2(12):1-10, the disclosure which is hereby incorporated by reference in its entirety. The article notes that topographical features on membranes can give rise to both super diffusion and subdiffusion. It is possible that such effects could contribute at least in part to the complex anomalous diffusion as described.

A possible limitation on the new FRAP system is that D(t) equations Eqs. 4, 9 and 14 require numerical differentiation of FRAP data, which may show large fluctuations when data are noisy. Nevertheless, even when the FRAP data are noisy, the auxiliary equation, MSD/(4t) may be used for preliminary screening for different diffusion mechanisms. The auxiliary equation MSD/(4t) curves may be calculated without making any assumptions about the underlying diffusion kinetics because they are calculated from a common MSD equation (Eq. 3, 8 and 16) that is generally valid for any FRAP data regardless of normal or anomalous diffusion hypothesis. Additionally, MSD/(4t) curves may differentiate normal diffusion and single power law anomalous diffusion from the other types of anomalous diffusion as predicted from the numerically simulated FRAP data (FIGS. 4A-4D).

Application to Single Particle Tracking

Single particle tracking (SPT) is another powerful tool to study the local diffusion process of a single protein or lipid molecule in live cells. SPT reports diffusion kinetics via mean square displacement (MSD), not time-dependent diffusion coefficients, D(t). It may be possible to compare the SPT data and FRAP data for diffusion. The MSD's may be calculated from FRAP data by a common MSD equation (Eq. 3, 8, and 15), which is valid for both normal and anomalous diffusion, and it is possible that the comparison of MSD's from FRAP and SPT may be accomplished using the modeling in the new FRAP system in accordance with a non-limiting example. It may be possible to calculate D(t) from the SPT measured MSD data and compare it with D(t) from FRAP data. By numerical differentiation (Eq. 16, 14):

$$\langle x^2 \rangle = 4 \int_0^t D(t)dt \Leftrightarrow D(t) = \frac{1}{4}\frac{d}{dt}\langle x^2 \rangle$$

A transport coefficient $\Gamma$ may be interpreted in a single power law $$MSD = \frac{4}{\alpha}\Gamma t^\alpha.$$

A diffusion coefficient D may describe the mean squared displacement in the unit of distance$^2$/time (MSD/(4t)). A transport coefficient $\Gamma$ may have a unit distance$^2$/time$^\alpha$ (MSD/(4t$^\alpha/\alpha$)), dependent on the magnitude of a parameter $\alpha$. Because of this dimensionality difference, the direct comparison of $\Gamma$ and D values may not be as relevant except for t=1, where the time dependence disappears.

It is possible to compare $\Gamma$ and D at t≠1 by scaling the time t by a reference time $\tau$. If time t is scaled as $\bar{t}=t/\tau$ where $\tau$ is a reference time, for example, the data acquisition time interval in the FRAP data, then $\bar{t}$ is dimensionless and a bulk parameter, $$\bar{\Gamma} = \frac{\Gamma}{\alpha}\tau^{\alpha-1}$$

has the unit of distance$^2$/time similar to a diffusion coefficient, D. In a new time scale, $\bar{t}$, the MSD is calculated as:

$$MSD = \frac{4}{\alpha}\Gamma t^\alpha$$
$$= \left(\frac{4\Gamma}{\alpha}\tau^{\alpha-1}\right)\tau\left(\frac{t}{\tau}\right)^\alpha$$
$$= 4(\bar{\Gamma}\tau)\bar{t}^\alpha$$

where $\bar{\Gamma}$ can be found from a MSD curve in time scale $\bar{t}$. Thus, it is possible to compare the magnitude of $\bar{\Gamma}$ and D at t=$\tau$. A careful choice of a $\tau$ between the different diffusion models would be advantageous in investigating diffusion in various time and length scales, e.g., hindered diffusion at shorter time and length scales.

Small perturbations of the function to be differentiated may lead to large errors in the computed derivative. Therefore, when the data is noisy with severe fluctuations, numerical differentiation may not yield reliable results. Even in that case, the new FRAP system may use an auxiliary equation, MSD/(4t) to test normal diffusion, single power law anomalous diffusion, and other anomalous diffusion (FIGS. 5A-5L), which is also true for MSD calculated from SPT data.

Application to Fluorescence Correlation Microscopy

Another tool used for studying biological diffusion is fluorescence correlation microscopy (FCS). For membrane diffusion, the FCS equation has a similar form to the FRAP equation:

$$G(\tau) = \frac{G_0}{1+\tau/\tau_D}$$

where $\tau_D = \omega^2/(4D)$ is the characteristic residence time with $\omega$ representing the $e^{-2}$ radius of the measurement volume, and $G_0 = 1/\langle N \rangle$ where $\langle N \rangle$ is the mean number of fluorescent molecules in the measurement volume. Similar to the FRAP equation (Eqs. 14, 16), MSD and D(t) for a general time dependent diffusion coefficient can be found as:

$$\begin{cases} \langle x^2 \rangle = \omega^2\left(\frac{G_0}{G(\tau_k)}-1\right) \\ D(\tau_k) = -\frac{G_0 G'(\tau_k)}{4\omega^2(G(\tau_k))^2} \end{cases}$$

without the single power law assumption. Since SPT, FCS, and FRAP can probe diffusion kinetics in different spatial and time scales, it may be advantageous to have tools that compare the MSD and D(t) from these three different approaches. The modeling associated with the new FRAP system may be used as a tool to compare the results from SPT, FCS, and FRAP.

The new FRAP system may calculate D(t) and MSD from confocal FRAP data and demonstrates that the single power law anomalous diffusion is not enough to describe a broad range of anomalous diffusion in cell membranes. A correlation may exist between diffusion mechanisms of membrane proteins and D(t) and the new FRAP system may be applied to certain types of domains impact diffusion in terms of time dependent diffusion coefficients.

Materials and Methods for Cell Labeling, Reagents and FRAP Techniques Used with the New FRAP System Detailed cell labeling, reagents, and the FRAP techniques used with the new FRAP system are now explained.

COS-7 cells were acquired from ATCC (Manassas, Va.). Cells were maintained in Dulbecco's modified Eagle medium (DMEM) containing 10% fetal bovine serum at 37° C. and 5% $CO_2$. Cells were plated on coverslips two days prior to experiments. Cells were transfected one day prior to imaging with either YFP-GL-GPI or YFP-GT46, using FuGENE 6 transfection reagent (Roche Diagnostics, Indianapolis, Ind.) DiIC16 (1,1'-dihexadecyl-3,3,3',3'-tetramethylindocarbocyanine perchlorate) and Alexa488 fluorophore-conjugated cholera toxin B subunit from *Vibrio cholerae* as obtained from Invitrogen (Carlsbad, Calif.).

For exogenous labeling, the cells were rinsed twice with phenol red-free DMEM supplemented with 25 mM HEPES (Sigma-Aldrich) and 1 mg/ml bovine serum albumin (Sigma-Aldrich) and then incubated for 5 minutes at room temperature with 100 nM A488-CTxB or 5 µg/ml DiIC16. Cells were then rinsed twice with media and imaged. Cells were maintained in phenol red-free DMEM supplemented with 1 mg/ml Bovine Serum Albumin and 25 mM HEPES buffer during imaging.

The new FRAP system experiments were carried out using a Zeiss LSM510 confocal microscope (Carl Zeiss MicroImaging, Jena, Germany) using filter sets provided by the manufacturer. Imaging was performed using a 40×1.3 NA Zeiss Plan-Neofluar objective at 4×zoom. The confocal pinhole was set between 1.01 and 1.99 Airy units. Full frame (512×512 pixels or 56×56 µm) images were collected for YFP-GL-GPI, YFP-GT46, and A488-CTxB. To account for the fast diffusion of DiIC16, the FRAP imaging window was further reduced to 4.1×8.2 µm to speed data acquisition. The FRAP ROI for all probes was a circular bleach ROI 4.1 µm in diameter.

A large bleach ROI was chosen to improve FRAP data for numerical differentiations by reducing the noises in FRAP curves. FRAP conditions were optimized for each molecule under study. Excitation energies were maintained between 0.3 and 0.9% transmission on the Argon laser line (ex. 488 or 514 nm) or 3.9% or 32% transmission on the HeNe laser line (ex. 543 nm). Bleaching was performed using the Argon laser light at 488 nm at 100% transmission (A488-CTxB), or 514 nm at 100% transmission (YFP-GL-GPI and YFP-GT46). In the case of DiIC16, the Argon and HeNe laser lines were used to photobleach at 100% transmission of 488, 514, and 543 nm laser light. Bleaching regions were scanned ten times. Pre-bleach and post-bleach images were collected with either no line averaging or with a line averaging of 2. Bleach times were 2.7 s (A488-CTxB, YFP-GL-GPI, and YFP-GT46) or 0.744 s (DiIC16). During pre- and post-bleach images were collected every 1.93 s (Alexa488-CTxB, YFP-GL-GPI, and YFP-GT46) or 0.071 s (DiIC16). All FRAP was performed at 37° C. using a stage heater.

Correction for Background and Photofading

For each protein, the new FRAP system experiments were performed at least ten times (n>10) which was counted as one FRAP data set and FRAP data sets were collected at least three different times on different days (N>3). For CTXB, DiIC16, and GL-GPI more than 10 FRAP data sets were collected (N>10, n>100). The new FRAP system analysis was performed on the averaged FRAP curves over each FRAP data set to reduce noise ($F_{raw}(t)$).

To correct for background ($F_{bk}$), fluorescence from a cell-free area of the coverslip was measured under the same conditions as FRAP was performed. To correct for observational photofading ($F_{fading}(t)$), a time series was collected using the same microscope setting as the FRAP experiments, without a photobleaching step. The raw FRAP data, $F_{raw}(t)$ were corrected for background and photofading by:

$$F_{corrected}(t) = \frac{F_{raw}(t) - F_{bk}}{F_{fading}(t) - F_{bk}}$$

Finally, the corrected data were normalized by pre-bleach intensity, $$F^i_{corrected} \text{ as } F_{Data}(t) = \frac{F_{corrected}(t)}{F^i_{corrected}}.$$

$r_e$ Measurements

The profiles were normalized by dividing the post-bleach profile by the pre-bleach profile. The normalized post-bleach profiles were averaged over data sets (N=10~14). Since the bleach ROI was slightly off center in some cases, the symmetry axis was found and set to be x=0 from the normalized mean post-bleach profile. The mean profiles were then fitted to:

$$f(x) = 1 - K \exp\left(-\frac{x^2}{r_e^2}\right)$$

with the bleaching depth parameter (K) and an effective radius ($r_e$) as fitting parameters to minimize the sum of mean square errors using a nonlinear least-squares fitting routine (nlinfit.m) such as available in MATLAB® (version 9.2.0, R2017a, The Mathworks, Inc.). The measured $r_e$'s from the data fitting was confirmed by comparing the $r_e$'s calculated from a formula:

$$r_e = r_{1/2} \sqrt{\frac{2}{\ln 2}} \approx 1.7 r_{1/2},$$

where $r_{1/2}$ is the the half width at the half depth.

$f_\infty$ Measurements

To find $f_\infty$, FRAP data was fitted to the single power law FRAP equation (Eq. 6) for $M_f$ using a nonlinear least-squares fitting routine (nlinfit.m) available in MATLAB® (version 9.2.0, R2017a, The Mathworks, Inc.).

Numerical Differentiation Via Lagrange Form of the Interpolation Polynomial

Differentiation formulas for the new FRAP system data was developed by differentiating the Lagrange form of the interpolation polynomial of the FRAP data. The first stage was to construct an interpolating polynomial from the three consecutive FRAP data:

$$p(t) = F(t_k - 1) \frac{(t-t_k)(t-t_{k+1})}{(t_{k-1}-t_k)(t_{k-1}-t_{k+1})} + F(t_k) \frac{(t-t_{k-1})(t-t_{k+1})}{(t_k-t_{k-1})(t_k-t_{k+1})} + F(t_{k+1}) \frac{(t-t_{k-1})(t-t_k)}{(t_{k+1}-t_{k-1})(t_{k+1}-t_k)}$$

where $F(t_k)$ is the FRAP data value at t=tk. An approximation of the derivative at any point ($t_k$, $F(t_k)$) can be obtained by direct differentiation of the interpolant polynomial:

$$F'(t_k) \simeq \frac{-3F(t_{k-1}) + 4F(t_k) - F(t_{k+1})}{2h}$$

which a second-order approximation of the first derivative.

It is possible to find a single power law anomalous diffusion coefficient, $\Gamma t^{\alpha-1}$ by fitting to either D(t) or FRAP data. A single power law anomalous diffusion parameter pair ($\Gamma$, a) was found by fitting the single power law anomalous diffusion FRAP model (Eq. 6) to the FRAP data for $\Gamma$ and $\alpha$ or by fitting $\Gamma t^{\alpha-1}$ directly to D(t) computed by Eq. 4, 9 and 14 from FRAP data. In both cases, a nonlinear least-squares fitting routine (nlinfit.m) available in MATLAB® (version 7.10, R2010a, The Mathworks, Inc.) was used to find the best fitting parameters.

Example Apparatus of New FRAP System

Figure 7:
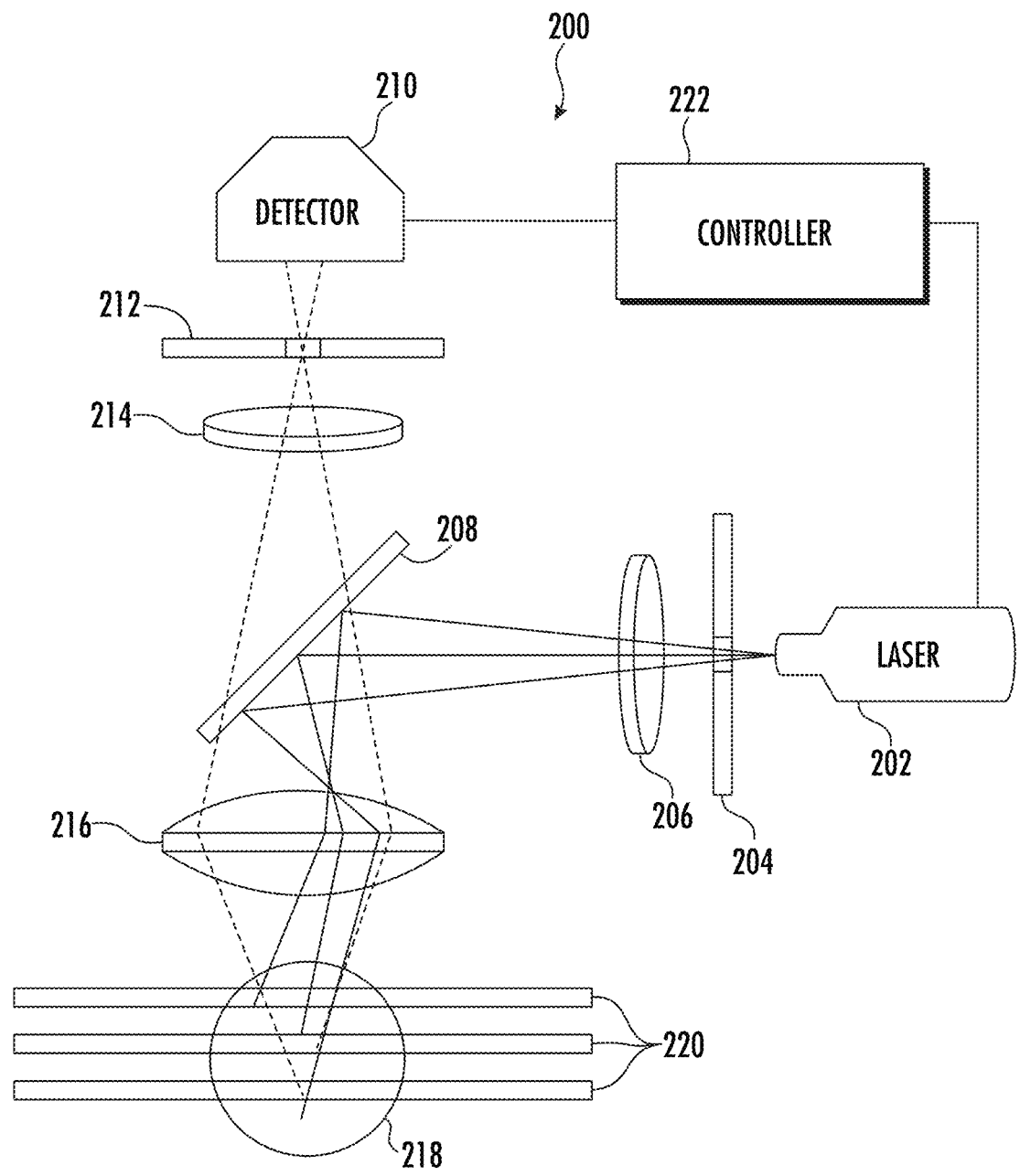
FIG. 7 is a schematic block diagram of a FRAP system that may measure anomalous diffusion in accordance with a non-limiting example.

Different devices may be used for the fluorescence recovery after photobleaching, and an example device is shown in FIG. 7 generally at 200. The laser excitation source 202 emits the laser beam such as through a light source pinhole aperture 204 into an excitation filter 206 and into a dichromatic mirror 208. The photomultiplier detector 210 in this example operates in conjunction with the detector pinhole aperture 212 and the fluorescence-barrier filter 214 and an objective lense 216. The specimen with the cell membrane is shown schematically at 218, and showing various focal planes 220. A controller 222 is connected to the detector 210 and laser 202.

The system 200 measures anomalous diffusion of biomolecules in cell membranes of intact cells, such as contained in the specimen 218. The laser 202 illuminates a cell membrane within an intact cell as part of the specimen 218 to express fluorescently tagged biomolecules. The laser 202 may be configured to photobleach a region of interest of the cell membrane and illuminate the region of interest over time. The detector 210 may be configured to detect the fluorescence recovery over time within the region of interest to yield fluorescence recovery after photobleaching (FRAP) data. The controller 222 may be connected to the laser 202 and detector 210 and may be configured to receive the FRAP data from the detector and compute the mean square displacement (MSD) of diffusing biomolecules and a time-dependent diffusion coefficient D(t) from a plurality of time points of the FRAP data and determine the anomalous diffusion in the cell membrane.

The fluorescently tagged biomolecules may include one or more of proteins and lipids. In an example, the fluorescently tagged biomolecules may include one or more of Alexa488-CTxB, YFP-GL-GPI, YFP-GT46 and Dil16 protein and lipid anchored probes. The controller 222 may be configured to determine the anomalous diffusion without a single power law assumption. The laser 202 may be formed as a confocal laser scanning microscope. The controller 222 may be configured to operate the detector 210 to alter a detector frame rate associated with detecting the fluorescence recovery between different biomolecules. The controller 222 may be configured to apply an Akaike Information Criterion (AIC) to the FRAP data and D(t) that yields negative values below −6000.

A method of measuring anomalous diffusion of biomolecules in cell membranes of intact cells is disclosed and includes expressing fluorescently tagged biomolecules within a cell membrane of an intact cell. The method includes photobleaching a region of interest having the expressed fluorescently tagged biomolecules with a laser 202, detecting the fluorescence recovery over time within the region of interest to yield fluorescence recovery after photobleaching (FRAP) data, and computing the mean square displacement (MSD) of diffusing biomolecules and a time-dependent diffusion coefficient D(t) from a plurality of time points of the FRAP data and determining the anomalous diffusion in the cell membrane.

The system 220 may have a controllable depth of field and eliminate image degrading for out-of-focus information and collect serial optical sections from thick specimens. Spatial filtering may eliminate out-of-focus light or flare in specimens that are thicker than the plane of focus by illuminating the object through a pinhole. Usually the image of the pinhole in the form of a small spot is formed on the specimen by a focused laser driven in one example by a galvanometer-based scanning system. This spot forms a reflected epi-fluorescence image on the original pinhole. If the specimen is in focus, the light passes through the pinhole to a detector 210 such as a photomultiplier. The light may be reflected and defocused at a pinhole.

Sometimes mammalian cells may be positioned about 10 micrometers of a cover, slip-medium interface, but other times, thicknesses can range from 10 to 200 micrometers. Techniques such as the laser scanning confocal/multiphoton device may be used, or a wide field fluorescence device or a spinning disc confocal device.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system of measuring anomalous diffusion of biomolecules in cell membranes of intact cells, comprising:
   a laser that illuminates a cell membrane within an intact cell to express fluorescently tagged biomolecules, wherein the laser is configured to photobleach a region of interest of the illuminated cell membrane and illuminate the region of interest over time, wherein the intact cell has been transfected with a plurality of different protein markers comprising at least one of YFP-GL-GPI and YFP-GT46 or other transmembrane proteins that are sensitive to cortical actin and are raft-associated to tag biomolecules within the cell membrane of the intact cell and form protein and lipid anchored probes;
   a detector configured to detect the fluorescence recovery over time within the region of interest to yield fluorescence recovery after photobleaching (FRAP) data; and
   a controller connected to the laser and detector and configured to receive the FRAP data from the detector and compute the mean square displacement (MSD) of diffusing biomolecules and determine diffusion coefficient plots from the FRAP data and applying an auxiliary MSD/4t as $$\frac{(r_e^2 + r_n^2)}{8t} \left( \frac{F(t_k) - F_0}{F_\infty - F(t_k)} \right)$$

for D(t) to the diffusion coefficient plots and differentiating membrane proteins from each other that are undergoing combinations of normal diffusion, anomalous diffusion, confined diffusion, immobilization and other modes of movement.

2. The system of claim 1, wherein the controller is configured to determine the anomalous diffusion without a single power law assumption.

3. The system of claim 1, wherein the laser comprises a confocal laser scanning microscope.

4. The system of claim 1, wherein the controller is configured to operate the detector to alter a detector frame rate associated with detecting the fluorescence recovery between different biomolecules.

5. The system of claim 1, wherein the controller is configured to apply an Akaike Information Criterion (AIC) to the FRAP data and auxiliary MSD/4t that yields negative values below −6000.

6. A method of measuring anomalous diffusion of biomolecules in cell membranes of intact cells, comprising:
   transfecting cells with a plurality of different membrane protein markers comprising at least one of YFP-GL-GPI and YFP-GT46 or other transmembrane proteins that are sensitive to cortical actin and are raft-associated to tag biomolecules within the cell membrane of the intact cell and form protein and lipid anchored probes;
   expressing the tagged biomolecules fluorescently within the cell membrane of the intact cell;
   photobleaching a region of interest having the expressed fluorescently tagged biomolecules with a laser;
   detecting the fluorescence recovery over time within the region of interest to yield fluorescence recovery after photobleaching (FRAP) data; and
   computing the mean square displacement (MSD) of diffusing biomolecules and determining diffusion coefficient plots from the FRAP data and applying an auxiliary MSD/4t as $$\frac{(r_e^2 + r_n^2)}{8t} \left( \frac{F(t_k) - F_0}{F_\infty - F(t_k)} \right)$$

for D(t) to the diffusion coefficient plots and differentiating membrane proteins from each other that are undergoing combinations of normal diffusion, anomalous diffusion, confined diffusion, immobilization and other modes of movement.

7. The method of claim 6, wherein determining the anomalous diffusion occurs without a single power law assumption.

8. The method of claim 6, wherein the laser comprises a confocal laser scanning microscope.

9. The method of claim 6, wherein detecting the fluorescence recovery over time includes altering a detector frame rate associated with detecting the fluorescence recovery between different biomolecules.

10. The method of claim 6, wherein an Akaike Information Criterion (AIC) is applied to the FRAP data and auxiliary MSD/4t that yields negative values below −6000.

11. A method of measuring anomalous diffusion of biomolecules in cell membranes of intact cells, comprising:
    transfecting cells with a plurality of different membrane protein markers comprising at least one of YFP-GL-GPI and YFP-GT46 or other transmembrane proteins that are sensitive to cortical actin and are raft-associated to tag biomolecules within the cell membrane of the intact cell and form protein and lipid anchored probes;
    detecting the fluorescence recovery over time within a photobleached region of interest having the fluorescently tagged biomolecules in the cell membrane of the intact cell to yield fluorescence recovery after photobleaching (FRAP) data; and
    computing the mean square displacement (MSD) of diffusing biomolecules and determining diffusion coefficient plots from the FRAP data and applying an auxiliary MSD/4t as $$\frac{(r_e^2 + r_n^2)}{8t}\left(\frac{F(t_k) - F_0}{F_\infty - F(t_k)}\right)$$

for D(t) to the diffusion coefficient plots and differentiating membrane proteins from each other that are undergoing combinations of normal diffusion, anomalous diffusion, confined diffusion, immobilization and other modes of movement.

12. The method of claim 11, comprising a confocal laser scanning microscope configured to a) express fluorescently tagged biomolecules within the cell membrane and b) photobleach the region of interest.

13. The method of claim 11, wherein detecting the fluorescence recovery over time includes altering a detector frame rate associated with detecting the fluorescence recovery between different biomolecules.

14. The method of claim 11, wherein an Akaike Information Criterion (AIC) is applied to the FRAP data and auxiliary MSD/4t that yields negative values below −6000.

* * * * *